(12) United States Patent
Akamine et al.

(10) Patent No.: US 8,521,674 B2
(45) Date of Patent: Aug. 27, 2013

(54) INFORMATION ANALYSIS SYSTEM, INFORMATION ANALYSIS METHOD, AND INFORMATION ANALYSIS PROGRAM

(75) Inventors: Susumu Akamine, Tokyo (JP); Satoshi Nakazawa, Tokyo (JP); Kai Ishikawa, Tokyo (JP); Toshio Takeda, Tokyo (JP)

(73) Assignee: NEC Corporation, Tokyo (JP)

( * ) Notice: Subject to any disclaimer, the term of this patent is extended or adjusted under 35 U.S.C. 154(b) by 486 days.

(21) Appl. No.: 12/596,209

(22) PCT Filed: Apr. 25, 2008

(86) PCT No.: PCT/JP2008/058093
§ 371 (c)(1),
(2), (4) Date: Oct. 16, 2009

(87) PCT Pub. No.: WO2008/136421
PCT Pub. Date: Nov. 13, 2008

(65) Prior Publication Data
US 2010/0076990 A1 Mar. 25, 2010

(30) Foreign Application Priority Data
Apr. 27, 2007 (JP) ................................. 2007-119039

(51) Int. Cl.
*G06F 17/00* (2006.01)
*G06N 5/00* (2006.01)

(52) U.S. Cl.
USPC .......................................................... 706/45

(58) Field of Classification Search
None
See application file for complete search history.

(56) References Cited

U.S. PATENT DOCUMENTS

| 5,638,487 | A  | * | 6/1997  | Chigier .......................... 704/253 |
| 5,857,173 | A  | * | 1/1999  | Beard et al. .................... 704/276 |
| 2003/0220791 | A1 | * | 11/2003 | Toyama ......................... 704/256 |
| 2006/0217968 | A1 | * | 9/2006  | Burges et al. ................. 704/205 |

FOREIGN PATENT DOCUMENTS

| JP | 2000194745 A | 7/2000 |
| WO | 03046764 A   | 6/2003 |

OTHER PUBLICATIONS

'A bidirectional transfer driven machine translation system for spoken dialogues': Sobashima, 1994, COLING 94: Proceedings of the 15th conference on computational linguistics.*
International Search Report for PCT/JP2008/058093 mailed May 27, 2008.
S. Nakajima et al., "Technology for Reliability Improvement of Web Information Retrieval Based on blog Analysis", the Japanese Society for Artificial Intelligence, Sixth Semantic Web and Onthology Study Group, SIG-SW0-A401-05, Jul. 2004.

(Continued)

*Primary Examiner* — Kakali Chaki
*Assistant Examiner* — Peter Coughlan

(57) ABSTRACT

A system includes a time-series data pattern checking means that receives time-series data from an input device and extracts a time-series pattern corresponding to the received time-series, and an effective period determination means that extracts an effective period corresponding to the time-series pattern from a time-series pattern/effective period correspondence table stored in a time-series pattern/effective period correspondence table storage means. The effective period determination means determines effective period time-series data which is a portion of the time-series data received from the input device in the effective period, according to the determined effective period and causes an output device to outputs the determined effective period and the determined effective period time-series data.

15 Claims, 18 Drawing Sheets

(56) References Cited

OTHER PUBLICATIONS

Y. Shimoda et al., "A study of public opinion surveys using weblogs", Information Processing Society of Japan Kenkyu Hokoku, Information Processing Society of Japan, May 31, 2006, vol. 2006, No. 59, pp. 61-68.

S. Ito et al., "Opinion Formation Dynamics Dependent on Findability", The Japanese Society for Artificial Intelligence Kenkyukai Shiryo, The Japanese Society for Artificial Intelligence, SIG-KBS-A604-02, Mar. 29, 2009, pp. 7-11.

S.Ito et al. "Opinion Formation Dynamics Dependent on Friability", The Japanese Society for Artificial Intelligence Kenkyukai Shiryo, The Japanese Society for Artificial Intelligence, SIG-KBS-A604, Mar. 29, 2007, pp. 7-11.

* cited by examiner

FIG. 9

| DATE | TRANSMITTER ATTRIBUTE | AFFIRMATIVE AND NEGATIVE OPINION LEVEL |
|---|---|---|
| 2002/7/5 | COMPANY | +2 |
| 2003/3/4 | NEWSPAPER | +3 |
| 2003/3/5 | MAGAZINE | +3 |
| 2003/10/5 | COMMON PERSON | +3 |
| 2003/12/7 | COMPANY | +3 |
| 2004/5/5 | NEWSPAPER | -2 |
| 2004/5/8 | COMMON BLOG | -2 |
| 2004/5/10 | COMMON BLOG | -2 |
| 2004/6/12 | MAGAZINE | -1 |
| 2005/5/8 | COMPANY | +2 |

FIG. 10

| PERIOD | TOTAL NUMBER OF OPINIONS | NUMBER OF AFFIRMATIVE OPINIONS | NUMBER OF NEGATIVE OPINIONS | DIFFERENCE BETWEEN NUMBERS OF AFFIRMATIVE AND NEGATIVE OPINIONS |
|---|---|---|---|---|
| 1998/1/1–1998/12/31 | 29 | 20 | 9 | 11 |
| 1999/1/1–1999/12/31 | 38 | 30 | 8 | 22 |
| 2000/1/1–2000/12/31 | 55 | 40 | 15 | 25 |
| 2001/1/1–2001/12/31 | 42 | 32 | 10 | 22 |
| 2002/1/1–2002/12/31 | 40 | 25 | 12 | 13 |
| 2003/1/1–2003/12/31 | 155 | 55 | 100 | -45 |
| 2004/1/1–2004/12/31 | 35 | 10 | 25 | -15 |
| 2005/1/1–2005/12/31 | 25 | 5 | 20 | -15 |
| 2006/1/1–2006/12/31 | 33 | 8 | 25 | -17 |
| 2007/1/1–2007/12/31 | 37 | 7 | 30 | -23 |

FIG. 11

| PERIOD | TOTAL NUMBER OF OPINIONS | NUMBER OF AFFIRMATIVE OPINIONS | NUMBER OF NEGATIVE OPINIONS | DIFFERENCE BETWEEN NUMBERS OF AFFIRMATIVE AND NEGATIVE OPINIONS |
|---|---|---|---|---|
| 1998/1/1~1998/12/31 | 29 | 20 | 9 | 11 |
| 1999/1/1~1999/12/31 | 38 | 30 | 8 | 22 |
| 2000/1/1~2000/12/31 | 55 | 40 | 15 | 25 |
| 2001/1/1~2001/12/31 | 42 | 32 | 10 | 22 |
| 2002/1/1~2002/12/31 | 40 | 25 | 12 | 13 |
| 2003/1/1~2003/12/31 | 54 | 34 | 20 | 14 |
| 2004/1/1~2004/12/31 | 35 | 25 | 10 | 15 |
| 2005/1/1~2005/12/31 | 25 | 20 | 5 | 15 |
| 2006/1/1~2006/12/31 | 33 | 25 | 8 | 12 |
| 2007/1/1~2007/12/31 | 37 | 30 | 7 | 23 |

FIG. 12

| PERIOD | TOTAL NUMBER OF OPINIONS | NUMBER OF AFFIRMATIVE OPINIONS | NUMBER OF NEGATIVE OPINIONS | DIFFERENCE BETWEEN NUMBERS OF AFFIRMATIVE AND NEGATIVE OPINIONS |
|---|---|---|---|---|
| 1998/1/1–1998/12/31 | 0 | 0 | 0 | 0 |
| 1999/1/1–1999/12/31 | 0 | 0 | 0 | 0 |
| 2000/1/1–2000/12/31 | 0 | 0 | 0 | 0 |
| 2001/1/1–2001/12/31 | 0 | 0 | 0 | 0 |
| 2002/1/1–2002/12/31 | 0 | 0 | 0 | 0 |
| 2003/1/1–2003/12/31 | 0 | 0 | 0 | 0 |
| 2004/1/1–2004/12/31 | 0 | 0 | 0 | 0 |
| 2005/1/1–2005/12/31 | 1 | 1 | 0 | 1 |
| 2006/1/1–2006/12/31 | 30 | 10 | 20 | -10 |
| 2007/1/1–2007/12/31 | 120 | 20 | 80 | -60 |

FIG. 13

| PERIOD | TOTAL NUMBER OF OPINIONS | NUMBER OF AFFIRMATIVE OPINIONS | NUMBER OF NEGATIVE OPINIONS | DIFFERENCE BETWEEN NUMBERS OF AFFIRMATIVE AND NEGATIVE OPINIONS |
|---|---|---|---|---|
| 1998/1/1~1998/12/31 | 3 | 2 | 1 | 1 |
| 1999/1/1~1999/12/31 | 38 | 30 | 8 | 22 |
| 2000/1/1~2000/12/31 | 0 | 0 | 0 | 0 |
| 2001/1/1~2001/12/31 | 0 | 0 | 0 | 0 |
| 2002/1/1~2002/12/31 | 40 | 25 | 12 | 13 |
| 2003/1/1~2003/12/31 | 2 | 1 | 1 | 0 |
| 2004/1/1~2004/12/31 | 0 | 0 | 0 | 0 |
| 2005/1/1~2005/12/31 | 3 | 3 | 0 | 3 |
| 2006/1/1~2006/12/31 | 33 | 25 | 8 | 12 |
| 2007/1/1~2007/12/31 | 0 | 0 | 0 | 0 |

FIG. 14

| FIRST CONDITION | SECOND CONDITION | THIRD CONDITION | TIME-SERIES PATTERN ID |
|---|---|---|---|
| NO BURST PERIOD IS PRESENT | NA | NA | 01 |
| ONE BURST PERIOD IS PRESENT | CURRENT TIME IS STILL IN BURST PERIOD | NA | 02 |
| | CURRENT TIME IS NOT IN BURST PERIOD | INVERSION IS PRESENT | 03 |
| | | INVERSION IS NOT PRESENT | 04 |
| TWO OR MORE BURST PERIODS ARE PRESENT | CURRENT TIME IS STILL IN BURST PERIOD | NA | 05 |
| | CURRENT TIME IS NOT IN BURST PERIOD | INVERSION IS PRESENT | 06 |
| | | INVERSION IS NOT PRESENT | 07 |

FIG. 15

| TIME-SERIES PATTERN ID | EFFECTIVE PERIOD |
|---|---|
| 01 | ENTIRE PERIOD |
| 02 | NONE |
| 03 | PERIOD AFTER INVERSION |
| 04 | ENTIRE PERIOD |
| 05 | NONE |
| 06 | PERIOD AFTER IMMEDIATELY PRECEDING INVERSION |
| 07 | ENTIRE PERIOD |

FIG. 16

| TIME-SERIES PATTERN ID | VARIATION TYPE |
|---|---|
| 01 | UNVARYING TYPE |
| 02 | BURST TYPE |
| 03 | INVERSION TYPE |
| 04 | SPECIFIC EVENT TYPE |
| 05 | BURST TYPE |
| 06 | VIOLENT FLUCTUATION TYPE |
| 07 | PERIODIC EVENT TYPE |

FIG. 17

| VARIATION TYPE | CONFIDENCE MEASURE WEIGHT BASED ON VARIATION TYPE |
|---|---|
| UNVARYING TYPE | 1.0 |
| BURST TYPE | 0.1 |
| INVERSION TYPE | 0.5 |
| SPECIFIC EVENT TYPE | 0.7 |
| VIOLENT FLUCTUATION TYPE | 0.3 |
| PERIODIC EVENT TYPE | 0.8 |

FIG. 18

| 1ST CONDITION | 2ND CONDITION | 3RD CONDITION | 4TH CONDITION | TIME-SERIES PATTERN ID |
|---|---|---|---|---|
| BURST STATE DOES NOT OCCUR IN TIME SERIES | DIVERGENCE STATE DOES NOT OCCUR IN TIME SERIES | ENTIRE TIME SERIES IS IN TRANSMISSION AMOUNT MAINTAINING STATE | ENTIRE TIME SERIES IS IN AFFIRMATION-NEGATION EQUILIBRIUM STATE | 01 (UNVARYING TYPE) |
| | | | TIME SERIES IS CURRENTLY IN AFFIRMATION DOMINANT AND AFFIRMING STATE OR NEGATION DOMINANT AND NEGATING STATE | 08 (DOMINANCE STRENGTHENED TYPE) |
| | | | TIME SERIES IS CURRENTLY AFFIRMATION DOMINANT AND NEGATING STATE OR NEGATION DOMINANT AND AFFIRMING STATE | 09 (INFERIORITY STRENGTHENED TYPE) |
| | | PART OF TIME SERIES IS NOT IN TRANSMISSION AMOUNT MAINTAINING STATE | NA | 06 (VIOLENT FLUCTUATION TYPE) |
| | DIVERGENCE STATE OCCURS IN TIME SERIES | NA | NA | 10 (DIVERGENCE TYPE) |
| ONE BURST STATE OCCUR IN TIME SERIES | CURRENT STATE IS STILL IN BURST STATE | NA | NA | 02 (BURST TYPE) |
| | CURRENT STATE IS NOT ALSO IN BURST STATE | INVERSION OCCURS IN TIME SERIES | NA | 03 (INVERSION TYPE) |
| | | INVERSION DOES NOT OCCUR IN TIME SERIES | NA | 04 (SPECIFIC EVENT TYPE) |
| TWO OR MORE BURST STATES OCCUR IN TIME SERIES | CURRENT STATE IS STILL IN BURST STATE | NA | NA | 05 (BURST TYPE) |
| | CURRENT STATE IS NOT ALSO IN BURST STATE | INVERSION OCCURS IN TIME SERIES | NA | 06 (VIOLENT FLUCTUATION TYPE) |
| | | INVERSION DOES NOT OCCUR IN TIME SERIES | NA | 07 (PERIODIC EVENT TYPE) |

INFORMATION ANALYSIS SYSTEM, INFORMATION ANALYSIS METHOD, AND INFORMATION ANALYSIS PROGRAM

The present invention is the National Phase of PCT/JP2008/058093, filed Apr. 25, 2008, which is based upon and claims the priority of Japanese Patent Application No. 2007-119039 filed on Apr. 27, 2007, the disclosure of which is incorporated herein in its entirety by reference thereto.

TECHNICAL FIELD

The present invention relates to an information analysis system, an information analysis method, and an information analysis program. More specifically, the invention relates to an information analysis system, an information analysis method, and an information analysis program that analyzes confidence of information based on affirmative opinions and negative opinions transmitted in a time series.

BACKGROUND ART

In recent years, a large amount of information that is a mixture of good and bad flows through Web pages or electronic bulletin boards on the Internet. For that reason, it has become difficult to determine which information on the Internet can be trusted and which information cannot be trusted.

Transmission information on a proposition such as "Fermented soybeans (fermented soybean) is effective for diet.", "Green tea prevents cancer.", "Pluto is a planet.", or "Tamiflu has a side effect", for example, can be obtained through the Internet. A lot of affirmative opinions and negative opinions about the transmission information on the proposition as mentioned above are described on Web pages or electronic bulletin boards on the Internet. It is difficult to determine confidence of the transmission information on those propositions such as whether or not the transmission information is correct, just by referring to a part of the opinions.

In order to solve the problem mentioned above, a system is proposed in which opinion information such as reputation information (information indicating whether transmission information on a proposition is true or not) is gathered from the Web and is classified into affirmative opinions and negative opinions, and confidence of the transmission information is evaluated based on the number of the affirmative or negative opinions, an attribute of an information originator, and the like.

An example of an information analysis system of a related art is described in Patent Document 1. In the information analysis system described in Patent Document 1, a personal opinion is extracted from Web pages, bulletin boards, or the like on the Internet. Then, based on referenced degree ranking, and the basis of the opinion or information indicating an identity of a speaker, the confidence measure of the extracted opinion is determined.

Another example of the information analysis system of the related all is described in Non-Patent Document 1. In the information analysis system described in Non-Patent Document 1, the familiarity level (professional level) of an information originator is estimated, based on the occurrence frequency of a keyword in an evaluator's blog (blog). Then, using the familiarity level of the information originator and an affirmation or negation measure, the confidence measure of information is calculated.

Patent Document 1: International Publication No. WO2003/046764 Pamphlet

Non-Patent Document 1: Shinsuke Nakajima et al., "Technology for Reliability Improvement of Web Information Retrieval Based on Blog Analysis", the Japanese Society for Artificial Intelligence, Sixth Semantic Web and Onthology Study Group, SIG-SW0-A401-05, July 2004

SUMMARY

The entire disclosures of Patent Document 1 and Non-Patent Document 1 are incorporated herein by reference thereto. Analyses of the related art by the present invention will be given below.

In the information analysis system of the related art described in each of Patent Document 1 and Non-Patent Document 1 however, when confidence of information is determined, the confidence measure is just determined based on a total sum of affirmative opinions and negative opinions which are weighted according to the attribute of an originator, without taking into consideration the presence of a time-series variation of evaluation on the information. For that reason, in the related art information analysis system described in each of Patent Document 1 and Non-Patent Document 1, evaluation on the confidence measure cannot be changed even if a large variation has occurred between the number of the affirmative opinions and the number of the negative opinions in a certain period.

It is assumed, for example, that the numbers of affirmative opinions and negative opinions on an opinion that "Pluto is a planet." before the year of 2006 were respectively 200 and 10. Further, it is assumed that the numbers of affirmative opinions and negative opinions on the opinion that "Pluto is a planet." after the year of 2006 were respectively 10 and 100. When the time-series variation is not taken into consideration at all in this case, the total numbers of the affirmative opinions and the negative opinions on the opinion that "Pluto is a planet." are respectively 210 and 110. For that reason, in the information analysis system of the related art, the number of the affirmative opinions is determined to be large. Then, confidence of the opinion that the "Pluto is a planet." is determined to be high to some extent.

The above example shows a case where confidence is determined using only the number of affirmative opinions and the number of negative opinions. Even if the confidence is determined by performing weighting according to the attribute of an originator, a similar result may be obtained.

Accordingly, it is an object of the present invention to provide an information analysis system, an information analysis method, and an information analysis program that can enhance confidence of information by taking into consideration a time-series variation of evaluation.

According to the present invention, there is provided an information analysis system including:

an effective period extraction unit (implemented by effective period extraction means 100, for example) including:

a time-series pattern identification unit (implemented by time-series data pattern checking means 11, for example) that identifies a time-series pattern on time-series data from the time-series data including sets of at least an affirmation level on a certain proposition and a time stamp corresponding to the affirmation level, based on at least one of indicators of a temporal variation in the total number of data of the time-series data for each time interval, a temporal variation of a mean of an affirmation level for each time interval and a temporal variation of a variance of an affirmation level distribution for each time interval; and an effective period identification unit (implemented by effective period determination means 13, for example) that identifies an effective period of the time-series data on the proposition, based on the identified time-series pattern.

In the information analysis system according to the present invention, the time-series pattern identification unit may further check whether or not the time-series data has assumed a burst state in which the total number of the data of the time-series data for each time interval increases in a short time to identify the time-series pattern on the time-series data.

In the information analysis system according to the present invention, the time-series pattern identification unit may further check whether or not the time-series data has assumed an inverted state in which an mean value of the affirmation levels of the time-series data for each time interval changes from a value on a negation side to a value on an affirmation side or from the value on the affirmation side to the value on the negation side to identify the time-series pattern on the time-series data.

In the information analysis system according to the present invention, the time-series pattern identification unit may further check whether or not the time-series data has assumed a divergence state in which a variance value of the affirmation level of the time-series data for each time interval exceeds a first threshold value defined in advance or the time-series data has assumed a convergence state in which the variance value falls below a second threshold value defined in advance to identify the time-series pattern on the time-series data.

The information analysis system according to the present invention may further include an effective period confidence measure calculation unit that extracts the time-series data included in the effective period identified by the effective period identification means, and then calculates the confidence measure of the time-series data included in the extracted effective period.

In the information analysis system, the effective period extraction means may include a time-series pattern table storage unit (implemented by time-series pattern storage means 12, for example) that stores a time-series pattern table (e.g. a time-series pattern correspondence table) that includes a plurality of time-series patterns on the temporal variation of the affirmation level, and the time-series pattern identification unit may identify the time-series pattern on the time-series data, based on the time-series pattern table stored in the time-series pattern table storage unit.

In the information analysis system, the effective period extraction means may include an effective period correspondence table storage unit (implemented by time-series pattern/effective period correspondence table storage means 14, for example) that stores an effective period correspondence table (e.g. a time-series pattern/effective period correspondence table) where the time-series patterns are associated with effective periods, and the effective period identification unit may extract the effective period corresponding to the time-series pattern identified by the time-series pattern identification unit from the effective period correspondence table stored in the effective period correspondence table storage unit.

In the information analysis system, the effective period identification unit may extract effective period time-series data which is a portion of the time-series data in the effective period of the time-series data.

The information analysis system may include an effective period confidence measure calculation unit (implemented by confidence measure calculation means 15, for example) that obtains an effective period confidence measure which is a confidence measure of the effective period time-series data extracted by the effective period identification unit.

In the information analysis system, the effective period extraction unit may include a variation type identification unit (implemented by variation type determination means 16, for example) that identifies a variation type indicating a type of variation of the time-series data, based on the time-series pattern identified by the time-series pattern identification unit.

In the information analysis system, the effective period extraction unit may include a variation type correspondence table storage unit (implemented by time-series pattern/variation type correspondence table storage means 17, for example) that stores a variation type correspondence table (e.g. a time-series pattern/variation type correspondence table) where the time-series patterns are associated with variation types, and the variation type identification unit may extract the variation type corresponding to the time-series pattern identified by the time-series pattern identification unit from the variation type correspondence table stored in the variation type correspondence table storage unit.

The information analysis system may include: an effective period variation type confidence measure calculation unit (implemented by confidence measure calculation means 15A, for example) that obtains an effective period variation type confidence measure which is a confidence measure of the effective period time-series data in consideration of the variation type, based on the effective period time-series data extracted by the effective period identification unit and the variation type identified by the variation type identification unit.

The information analysis system may include: a weighting factor correspondence table storage unit that stores a weighting factor correspondence table (e.g. a variation type/confidence measure weight correspondence table) where the variation types are associated with weighting factors. The effective period variation type confidence measure calculation unit may extract one of the weighting factors corresponding to the variation type identified by the variation type identification unit from the weighting factor correspondence table stored in the weighting factor correspondence table storage unit, and may determine the effective period variation type confidence measure, using the extracted weighting factor.

According to the present invention, there is provided an information analysis method including:

a time-series pattern identification step of identifying a time-series pattern on time-series data from the time-series data including sets of at least an affirmation level on a certain proposition and a time stamp corresponding to the affirmation level, based on at least one of indicators of a temporal variation in the total number of data of the time-series data for each time interval, a temporal variation of a mean of an affirmation level for each time interval and a temporal variation of a variance of an affirmation level distribution for each time interval; and an effective period identification step of identifying an effective period of the time-series data on the proposition, based on the identified time-series pattern.

In the information analysis method according to the present invention, when the time-series pattern on the time-series data is identified, it may be further checked whether the time-series data has assumed a burst state in which the total number of the time-series data for each time interval increases in a short time. The time-series pattern of the time-series data may be thereby identified.

In the information analysis method according to the present invention, when the time-series pattern on the time-series data is identified, it may be further checked whether the time-series data has assumed an inverted state in which a mean value of the affirmation levels of the time-series data for each time interval changes from a value on a negation side to a value on an affirmation side or from the value on the affirmation side to the value on the negation side. The time-series pattern of the time-series data may be thereby identified.

In the information analysis method according to the present invention, when the time-series pattern on the time-series data is identified, it may be further checked whether the time-series data has assumed a divergence state in which a variance value of the affirmation level of the time-series data for each time interval exceeds a first threshold value defined in advance or the time-series data has assumed a convergence state in which the variance value falls below a second threshold value defined in advance. The time-series pattern of the time-series data may be thereby identified.

In the information analysis method according to the present invention, the time-series data included in the effective period may be extracted, and then the reliability degree of the time-series data included in the extracted effective period may be calculated.

In the time-series pattern identification step of the information analysis method, the time-series pattern of the time-series data may be identified, based on a time-series pattern table which is stored in a storage device and which includes a plurality of time-series patterns on the temporal variation of the affirmation levels.

In the effective period identification step of the information analysis method, the effective period corresponding to the identified time-series pattern may be extracted from the effective period correspondence table which is stored in a storage device and in which the time-series patterns are associated with effective periods.

In the effective period identification step of the information analysis method, effective period time-series data which is a portion of the time-series data in the effective period of the time-series data may be extracted.

The information analysis method may include an effective period confidence measure calculation step of determining an effective period confidence measure which is a confidence measure of the extracted effective period time-series data.

The information analysis method may include a variation type identification step of identifying a variation type indicating a type of variation of the time-series data, based on the identified time-series pattern.

In the variation type identification step of the information analysis method, the variation type corresponding to the identified time-series pattern may be extracted from a variation type correspondence table which is stored in a storage device and in which the time-series patterns are associated with variation types.

The information analysis method may include an effective period variation type confidence measure calculation step of obtaining an effective period variation type confidence measure which is a confidence measure of the effective period time-series data in consideration of the variation type, based on the extracted effective period time-series data and the identified variation type.

In the effective period variation type confidence measure calculation step of the information analysis method, a weighting factor corresponding to the identified variation type may be extracted from a weighting factor correspondence table which is stored in a storage device and in which the variation types are associated with weighting factors and the effective period variation type confidence measure may be determined, using the extracted weighting factor.

According to the present invention, there is provided a computer readable recording medium storing an information analysis program which causes a computer to execute:

a time-series pattern identification process that identifies a time-series pattern on time-series data from the time-series data including sets of at least an affirmation level on a certain proposition and a time stamp corresponding to the affirmation level, based on at least one of indicators of a temporal variation in the total number of the time-series data for each time interval, a temporal variation of a mean of an affirmation level for each time interval and a temporal variation of a variance of an affirmation level distribution for each time interval; and an effective period identification process that identifies an effective period of the time-series data on the proposition, based on the identified time-series pattern.

The information analysis program according to the present invention may cause the computer to execute a process that further checks whether or not the time-series data has assumed a burst state in which the total number of the time-series data for each time interval increases in a short time to identify the time-series pattern of the time-series data.

The information analysis program according to the present invention may cause the computer to execute a process that further checks whether or not the time-series data has assumed an inverted state in which a mean value of the affirmation levels of the time-series data for each time interval changes from a value on a negation side to a value on an affirmation side or from the value on the affirmation side to the value on the negation side to identify the time-series pattern of the time-series data.

The information analysis program according to the present invention may cause the computer to execute a process that further checks whether or not the time-series data has assumed a divergence state in which a variance value of the affirmation level of the time-series data for each time interval exceeds a first threshold value defined in advance or the time-series data has assumed a convergence state in which the variance value falls below a second threshold value defined in advance to identify the time-series pattern of the time-series data.

The information analysis program according to the present invention may cause the computer to execute an effective period confidence measure calculation process that extracts the time-series data included in the effective period identified in the effective period identification process, and then calculates the confidence measure of the time-series data included in the extracted effective period.

The information analysis program may cause the computer to execute a process that identifies the time-series pattern, using at least one of indicators of a temporal variation in the total number of the sets of the time-series data for each predetermined time interval, a temporal variation of a mean of an affirmation level included in the time-series data, and a temporal variation of a variance of an affirmation level distribution included in the time-series data, in the time-series pattern identification process.

The information analysis program may cause the computer to execute a process that identifies the time-series pattern of the time-series data, based on a time-series pattern table which is stored in a storage device and which includes a plurality of time-series patterns on the temporal variation of the affirmation level, in the time-series pattern identification process.

The information analysis program may cause the computer to execute a process that extracts the effective period corresponding to the identified time-series pattern from an effective period correspondence table which is stored in a storage device and in which the time-series patterns are associated with effective periods, in the effective period identification process.

The information analysis program may cause the computer to execute a process that extracts effective period time-series data which is a portion of the time-series data in the effective period of the time-series data, in the effective period identification process.

The information analysis program may cause the computer to execute an effective period confidence measure calculation process that obtains an effective period confidence measure which is a confidence measure of the extracted effective period time-series data.

The information analysis program may cause the computer to execute a variation type identification process that identifies a variation type indicating a type of variation of the time-series data, based on the identified time-series pattern.

The information analysis program may cause the computer to execute a process that extracts the variation type corresponding to the identified time-series pattern from a variation type correspondence table which is stored in a storage device and in which the time-series patterns are associated with variation types, in the variation type identification process.

The information analysis program may cause the computer to execute an effective period variation type confidence measure calculation process that obtains an effective period variation type confidence measure which is a confidence measure of the effective period time-series data in consideration of the variation type, based on the extracted effective period time-series data and the identified variation type.

The information analysis program may cause the computer to execute:

a process that extracts a weighting factor corresponding to the identified variation type from a weighting factor correspondence table which is stored in a storage device and in which the variation types are associated with weighting factors; and a process that obtains the effective period variation type confidence measure, using the extracted weighting factor, in the effective period variation type confidence measure calculation process.

According to the present invention, the time-series pattern of time-series data is identified, and the effective period of the time-series data is identified, based on the identified time-series pattern. For that reason, the period including a highly trustworthy portion of the time-series data can be grasped, and the highly trustworthy portion of the time-series data can be obtained. Accordingly, by taking into consideration of a time-series variation of evaluation, confidence of the information can be enhanced. Further, the effective period can be presented to a user as information for analyzing the confidence of the information.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 9 is an explanatory diagram showing an example of time-series data;

FIG. 10 is an explanatory diagram showing a table indicating results of accumulating the time-series data;

FIG. 11 is an explanatory diagram showing a table indicating results of accumulating the time-series data;

FIG. 12 is an explanatory diagram showing a table indicating results of accumulating the time-series data:

FIG. 13 is an explanatory diagram showing a table indicating results of accumulating the time-series data;

FIG. 14 is an explanatory diagram showing a specific example of a time-series pattern correspondence table:

FIG. 15 is an explanatory diagram showing a specific example of a time-series pattern/effective period correspondence table:

FIG. 16 is an explanatory diagram showing a specific example of a time-series pattern/variation type correspondence table;

FIG. 17 is an explanatory diagram showing a specific example of a variation type/confidence measure weight correspondence table; and FIG. 18 is an explanatory diagram showing another example of the time-series pattern correspondence table.

PREFERRED MODES

First Exemplary Embodiment

Figure 1:
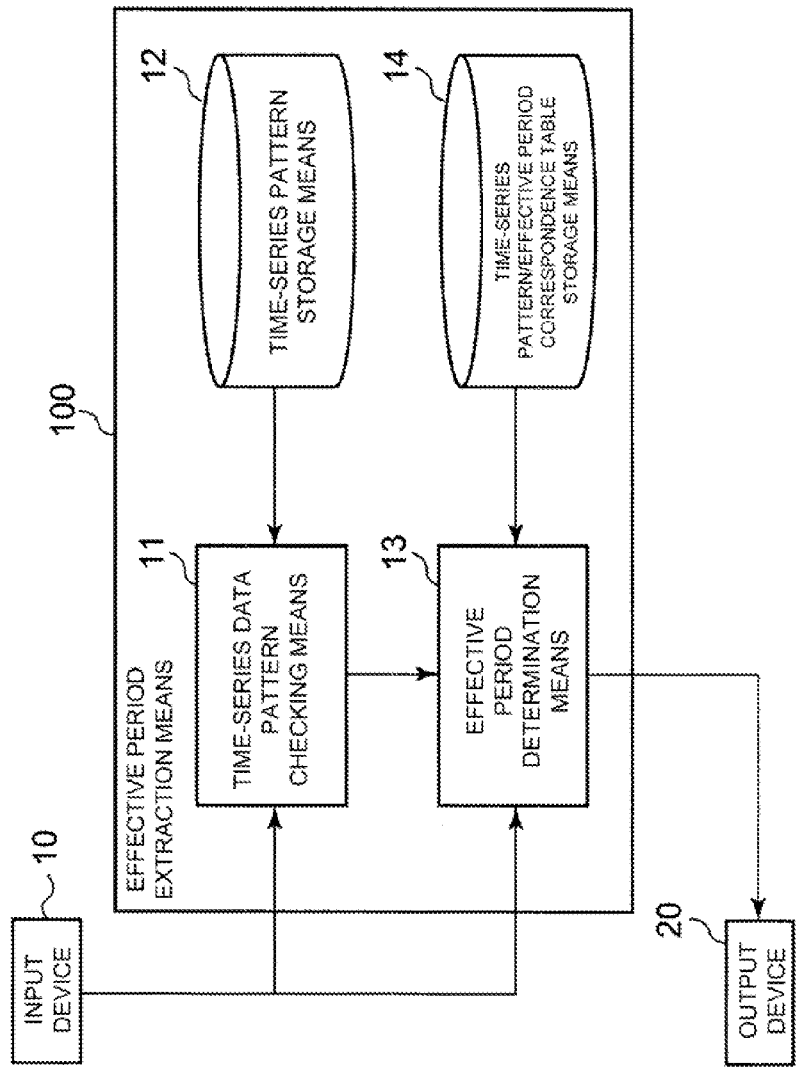
FIG. 1 is a block diagram showing a configuration example of an information analysis system according to the present invention.

A first exemplary embodiment of the present invention will be described with reference to drawings. FIG. 1 is a block diagram showing a configuration example of an information analysis system according to the present invention. As shown in FIG. 1, the information analysis system includes an input device 10, an effective period extraction means 100, and an output device 20. The effective period extraction means 100 includes a time-series data pattern checking means 11, a time-series pattern storage means 12, an effective period determination means 13, and a time-series pattern/effective period correspondence table storage means 14.

In this exemplary embodiment, specifically, the information analysis system is implemented by a data processing device such as a personal computer that operates according to a program. The information analysis system is applied to a use where confidence of information gathered through the Internet is evaluated, for example.

The input device 10 is implemented by a CPU and a network interface unit of a data processing device that operates according to a program, for example. The input device 10 includes a function of loading a plurality of files (various transmission information on a certain proposition) stored in a database device in advance, extracting information indicating an affirmative or negative opinion level on the certain proposition, and then outputting time-series data. The input device 10 extracts information indicating an affirmative opinion that "Fermented soybeans are effective for diet." or information indicating a negative opinion that "Fermented soybeans are not effective for diet." for a proposition such as "Are fermented soybeans effective for diet?", for example.

In this exemplary embodiment, a "proposition" is defined to be a matter of which authenticity can be examined. A user gathers affirmative and negative opinions on a proposition from various transmission information on the Internet and examines authenticity of the proposition by referring to the affirmative and negative opinions.

It is assumed that "time-series data" is a collection of the transmission information including transmission times, and that affirmation or negation measures of the affirmative opinions and negative opinions on the proposition are given by numbers of −3, −2, −1, 0, +1, +2, +3, and the like, in advance. That is, a minimum component of the time-series data is a collection of sets of time stamps (transmission times) and affirmation levels (affirmation or negation measures). In addition to the information mentioned above, the time-series data may include information on an attribute of the transmission information such as a transmission purpose, citation, or a topic, or attribute information on an originator such as a standpoint or knowledge and experience of the originator.

More specifically, the input device 10 extracts information indicating affirmative opinion levels or negative opinion levels on a certain proposition, using a reputation information extracting technique that extracts affirmative and negative expressions on a target from the Web as reputation information or a text mining technique, and outputs the extracted information as time-series data. The above-mentioned reputation information extracting technique is described in the literature of Kenji Tateishi, Yoshihide Ishiguro, and Toshikazu Fukushima, "A Reputation Search Engine from the Internet", Journal of the Japanese Society for Artificial Intelligence, Vol. 19, No. 3, May 2004.

In this exemplary embodiment, a database device stores transmission information with transmission dates (stores the transmission information, corresponding to the transmission dates, for example) in advance. Then, the input device 10 extracts information indicating an affirmative or negative opinion level with a transmission time from each file stored in the database device to output the time-series data. In this exemplary embodiment, the input device 10 outputs the time-series data including a transmission time, affirmative or negative opinion measures, transmission information, and an attribute of an originator.

Alternatively, the input device 10 may gather various transmission information through a network such as the Internet, may extract information indicating an affirmative or negative opinion measure on a certain proposition from each of the gathered transmission information, and may output time-series data, for example. In this case as well, the input device 10 gathers transmission information with a transmission date (transmission information with meta information including the transmission date added thereto) through the network, and extracts, from each gathered transmission information, the information indicating the measure of an affirmative or negative opinion together with the transmission information.

More specifically, the time-series pattern storage means 12 is implemented by a storage device such as a hard disk drive. The time-series pattern storage means 12 stores a time-series pattern correspondence table including a plurality of time-series patterns indicating patterns of time-series data. In this exemplary embodiment, the time-series pattern storage means 12 stores the time-series pattern correspondence table including time-series pattern IDs whereby the respective time-series patterns can be identified.

In this exemplary embodiment, a typical pattern in which the frequency distribution of an affirmation level varies with time is referred to as a "time-series pattern". The frequency distribution of the affirmation level is obtained by collecting affirmation levels on a proposition in time-series data for each constant time interval. More specifically, the time-series data is classified into respective time-series patterns, using the time-series pattern correspondence table as shown in FIG. 14, which will be described later. With this arrangement, the time-series data having the time-series pattern ID of 01 corresponds to a pattern where a large temporal variation is not seen in the distribution of the affirmation level in a whole period of a time series. The time-series data having the time-series pattern ID of 02 corresponds to a pattern in which a burst is present during a certain portion of the entire period of the time series and this burst occurs at a current time. The burst is a phenomenon in which the number of data explosively increases during a certain period.

More specifically, the time-series data pattern checking means 11 is implemented by the CPU of the data processing device that operates according to a program. The time-series data pattern checking means 11 includes a function of receiving the time-series data from the input device 10 and then identifying the time-series pattern that indicates the variation pattern of the received time-series data. More specifically, the time-series data pattern checking means 11 compares the time-series data received from the input device 10 with each time-series pattern shown in the time-series pattern correspondence table stored in the time-series pattern storage means 12 to identify the time-series pattern that matches the received time-series data. Then, the time-series data pattern checking means 11 extracts the time-series pattern ID corresponding to the identified time-series pattern from the time-series pattern correspondence table to supply the extracted time-series pattern ID to the effective period determination means 13.

The received time-series data in its entirety does not necessarily match the time-series pattern indicated in the time-series pattern correspondence table. When a partial segment of the received time-series data matches the time-series pattern shown in the time-series pattern correspondence table, the time-series data pattern checking means 11 supplies to the effective period determination means 13 a pattern-matched segment indicating a segment that has matched the time-series pattern in the time-series data. When the entirety of the time-series data matches the time-series pattern, the time-series data pattern checking means 11 may output information indicating an entire period of the time-series data as the pattern-matched segment.

More specifically, the time-series pattern/effective period correspondence table storage means 14 is implemented by a storage device such as a hard disk drive. The time-series pattern/effective period correspondence table storage means 14 stores a time-series pattern/effective period correspondence table including an effective period in time-series data for each time-series pattern. In this exemplary embodiment, the time-series pattern/effective period correspondence table storage means 14 stores the time-series pattern/effective period correspondence table that includes the effective period in the time-series data, corresponding to the time-series pattern ID.

In this exemplary embodiment, a period in time-series data that is effective in determining authenticity of a certain proposition at a certain time based on the time-series data is referred to as an "effective period". More specifically, the effective period of the time-series data is derived from the time-series pattern according to the time-series pattern/effective period correspondence table as shown in FIG. 15, which will be described later. With this arrangement, since a large temporal variation is not seen in the distribution of the affirmation level of the time-series data having the time-series pattern ID of 01 in the entire period of the time series, the period (i.e. effective period) of the time-series data that is effective in determining authenticity of a proposition is the entire period. Further, in the time-series data having the time-series pattern ID of 02, the explosive increase in the number of data in the certain period occurs at the current time. Thus, transmission of information on this proposition is currently still very active. Accordingly, it means that the period (effective period) of the time-series data that is effective in determining authenticity of the proposition does not exist in this time-series data.

More specifically, the effective period determination means 13 is implemented by the CPU of the data processing device that operates according to a program. The effective period determination means 13 includes a function of determining the effective period that is a period where effective data in time-series data is included, based on the time-series data received from the input device 10 and the time-series pattern identified by the time-series data pattern checking means 11. The effective period determination means 13 further includes a function of determining the data in the effective period (effective period time-series data) in the time-series data received from the input device 10, according to the determined effective period.

There is a case wherein even if a plurality of transmission information on a certain proposition have been collected, the information transmitted before a certain time may not be able to be referred to in evaluating authenticity of the proposition, due to the fact that a theory that had been predominant has changed at the certain time. In such a case, the effective period determination means 13 determines a period including only transmission information that can be referred to in evaluating the authenticity of the proposition after the change in the predominant theory, as the effective period.

More specifically, the effective period determination means 13 identifies, from the time-series pattern/effective period correspondence table, the effective period corresponding to the time-series pattern ID received from the time-series data pattern checking means 11. The effective period determination means 13 extracts the effective period time-series data from the time-series data, according to the identified effective period. When the pattern-matched segment is received from the time-series data pattern checking means 11, the effective period determination means 13 extracts data that matches both of the pattern-matched segment and the effective period of the time-series data received from the input device 10, as the effective period time-series data.

The effective period determination means 13 further includes a function of causing the output device 20 to output the determined effective period and the determined effective period time-series data.

The effective period determination means 13 may find and provide only the effective period of the time-series data to the output device 20. Alternatively, the effective period determination means 13 may find and provide only the effective period time-series data to the output device 20. The effective period determination means 13 may find and supply both of the effective period and the effective period time-series data to the output device 20.

More specifically, the output device 20 is implemented by a display device of a display system, or the like. The output device 20 includes a function of displaying the effective period or the effective period time-series data according to an instruction of the effective period determination means 13.

The effective period determination means 13 may output a file including the determined effective period or the effective period time-series data, for example, without displaying the effective period and the effective period time-series data. Alternatively, the effective period determination means 13 may cause a printing device such as a printer to output the effective period and the effective period time-series data.

The storage device of the data processing device that implements the information analysis system in this exemplary embodiment stores various programs for analyzing information transmitted in a time series. The storage device (not shown) of the data processing device stores an information analysis program for causing a computer to execute a time-series pattern identifying process and an effective period identifying process. In the time-series pattern identifying process, a time-series pattern indicating an affirmation level temporal variation of time-series data that includes at least affirmation levels on a certain proposition and time stamps is identified. In the effective period identifying process, the effective period of the time-series data is identified based on the identified time-series pattern.

Figure 2:
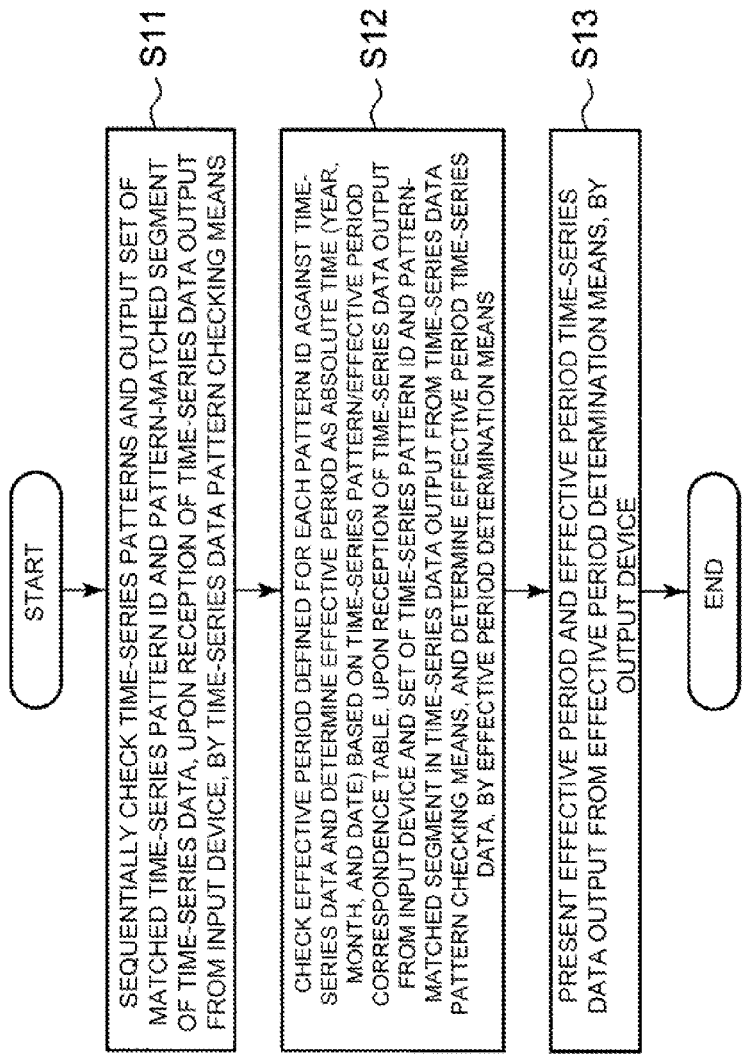
FIG. 2 is a flowchart showing an example of a process in which the information analysis system analyzes information transmitted in a time series.

Next, an operation will be described. FIG. 2 is a flowchart showing an example of a process in which the information analysis system analyzes information transmitted in a time series. The input device 10 of the information analysis system loads each file from the database device, or gathers various transmission information through the network to extract time-series data, according to an operation for information collection or information retrieval by the user.

Next, the time-series data pattern checking means 11 of the information analysis system identifies a time-series pattern and extracts the time-series pattern ID of the time-series pattern, based on the time-series data received from the input device 10 and the time-series pattern correspondence table stored in the time-series pattern storage means 12. In this case, the time-series data pattern checking means 11 receives the time-series data output from the input device 10 and sequentially checks time-series patterns included in the time-series pattern correspondence table. Then, the time-series data pattern checking means 11 outputs a set of the time-series pattern ID and a pattern-matched segment in the time-series data based on a result of checking (in step S11).

Next, the effective period determination means 13 of the information analysis system determines an effective period and effective period time-series data, based on the time-series data received from the input device 10, the time-series pattern ID and the pattern-matched segment from the time-series data pattern checking means 11, and the time-series pattern/effective period correspondence table stored in the time-series pattern/effective period correspondence table storage means 14.

In this case, the effective period determination means 13 receives the time-series data output from the input device 10 and a set of the time-series pattern ID and the pattern-matched segment in the time-series data output from the time-series data pattern checking means 11 and checks an effective period defined for each time-series pattern ID against the time-series data, based on the time-series pattern/effective period correspondence table. Then, the effective, period determination means 13 determines the effective period as an absolute time (such as a year, a month, a day, or a time), based on the result of the checking. Further, the effective period determination means 13 determines the effective period time-series data according to the determined effective period (in step S12).

Next, the effective period determination means 13 causes the output device 20 to output the determined effective period and the determined effective period time-series data. Then, the output device 20 outputs (e.g., displays) the effective period and the effective period time-series data according to an instruction of the effective period determination means 13 (in step S13).

By identifying the output effective period and the output effective period time-series data, the user can recognize the period in which the effective and highly trustworthy data in the time-series data is included and the highly trustworthy data. Further, a user can perform various statistical processes such as data mining using only highly trustworthy data in time-series data, based on an effective period or effective period time-series data which has been output. With that arrangement, a highly trustworthy statistical process result can be obtained.

As described above, according to this exemplary embodiment, the effective period and the effective period time-series data of time-series data received by the input device 10 are determined. For that reason, a period in which highly trustworthy data of the time-series data is included can be grasped. Thus, the highly trustworthy data of the time-series data can be obtained. Accordingly, confidence of information can be enhanced, by taking into consideration of a time-series variation of evaluation.

Second Exemplary Embodiment

Figure 3:
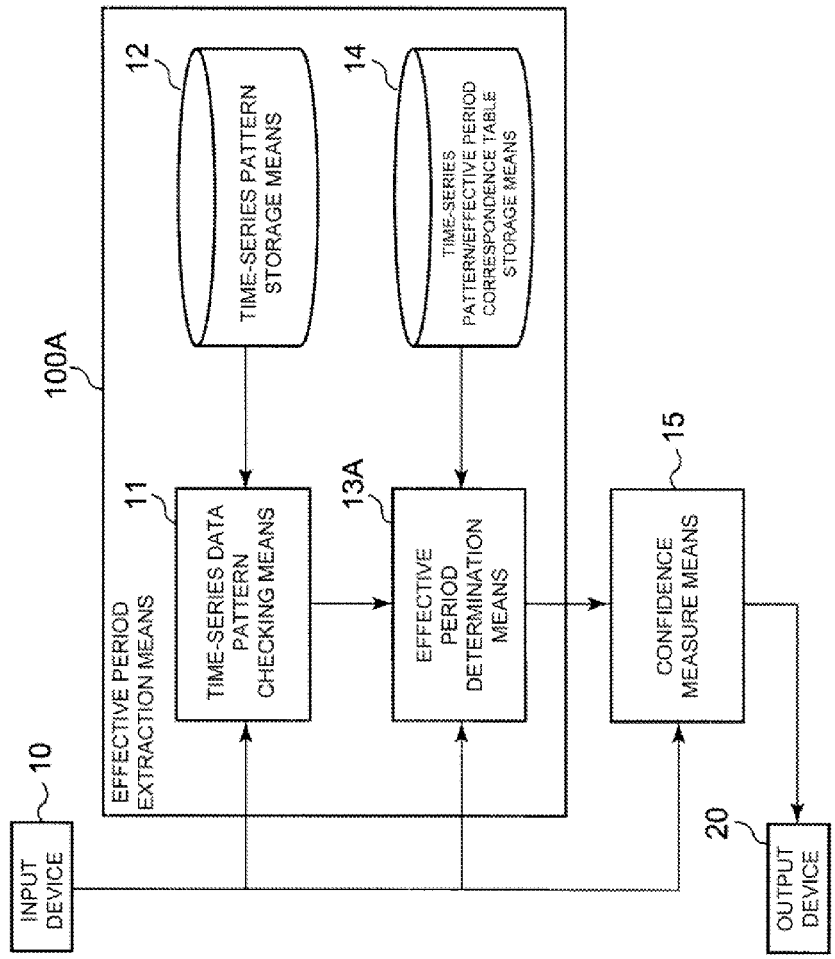
FIG. 3 is a block diagram showing a configuration example of an information analysis system in a second exemplary embodiment.

Next, a second exemplary embodiment of the present invention will be described with reference to drawings. FIG. 3 is a block diagram showing a configuration example of an information analysis system in the second exemplary embodiment. In this exemplary embodiment, the information analysis system is different from the first exemplary embodiment in that the information analysis system includes a confidence measure calculation means 15 in addition to components shown in FIG. 1. Further, in this exemplary embodiment an effective period determination means 13A and the effective period determination means 13 shown in the first exemplary embodiment differ in function.

The effective period determination means 13A includes a function of determining effective period time-series data based on time-series data received from the input device 10 and a time-series pattern identified by the time-series data pattern checking means 11, according to a process similar to that executed by the effective period determination means 13 shown in the first exemplary embodiment. Further, the effective period determination means 13A includes a function of outputting the determined effective period time-series data to the confidence measure calculation means 15.

More specifically, the confidence measure calculation means 15 is implemented by a CPU of a data processing device that operates according to a program. The confidence measure calculation means 15 includes a function of determining the confidence measure of an entire portion of the time-series data and the confidence measure of individual transmission information included in the time-series data, based on the time-series data received from the input device 10. The confidence measure calculation means 15 further includes a function of determining the confidence measure of the effective period time-series data (hereinafter referred to as an effective period confidence measure), based on the effective period time-series data from the effective period determination means 13A.

In this exemplary embodiment, the "confidence measure" of certain time-series data is a measure indicating how trustworthy decision can be obtained when authenticity of a given proposition is determined based on the time-series data. Further, the "effective period confidence measure" is a measure indicating how trustworthy decision can be obtained when a part series in the effective period of the time-series data is extracted and then authenticity of the proposition is determined based on the part series.

Functions of the respective components of the information analysis system except the effective period determination means 13A and the confidence measure calculation means 15 are similar to those shown in the first exemplary embodiment.

Figure 4:
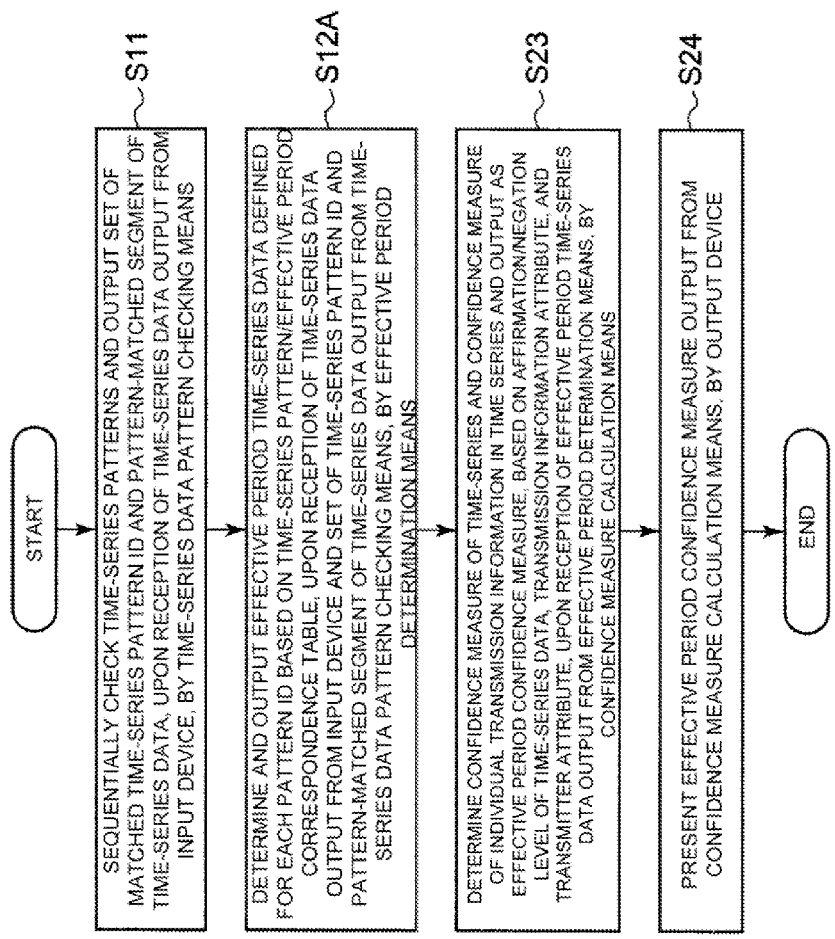
FIG. 4 is a flowchart showing an example of a process in which the information analysis system in the second exemplary embodiment analyzes information transmitted in a time series.

Next, an operation will be described. FIG. 4 is a flowchart showing an example of a process in which the information analysis system in the second exemplary embodiment analyzes information transmitted in a time series. Referring to FIG. 4, a process in step S11 is the same as that in step S11 shown in the first exemplary embodiment.

Next, the effective period determination means 13A of the information analysis system determines effective period time-series data, based on time-series data received from the input device 10, a time-series pattern ID and a pattern-matched segment from the time-series data pattern checking means 11, and the time-series pattern/effective period correspondence table stored in the time-series pattern/effective period correspondence table storage means 14.

In this case, the effective period determination means 13A receives the time-series data output from the input device 10 and a set of the time-series pattern ID and the pattern-matched segment in the time-series data that have been output from the time-series data pattern checking means 11 and checks an effective period defined for each time-series pattern ID against the time-series data, based on the time-series pattern/effective period correspondence table. Then, the effective period determination means 13A determines the effective period time-series data, based on a result of checking (in step S12A).

Next, the confidence measure calculation means 15 determines the confidence measure of an entire portion of the time-series data and the confidence measure of individual transmission information included in the time-series data, based on the time-series data received from the input device 10. Further, the confidence measure calculation means 15 determines the effective period confidence measure, based on the effective period time-series data from the effective period determination means 13A.

In this case, the confidence measure calculation means 15 receives the effective period time-series data output from the effective period determination means 13A and determines the confidence measure of the entire time-series data and the confidence measure of individual transmission information included in the time-series data, as the effective period confidence measure, based on an affirmation or negation measure of the time-series data, and the attribute of the transmission information or the attribute of an originator (in step S23).

Next, the confidence measure calculation means 15 causes the output device 20 to output the determined effective period confidence measure. Then, the output device 20 outputs (e.g. displays) the effective period confidence measure, according to an instruction of the confidence measure calculation means 15 (in step S24). In this case, the confidence measure calculation means 15 may further output the confidence measure of the entire time-series data and the confidence measure of individual transmission information included in the time-series data.

As described above, according to this exemplary embodiment, the effective period time-series data of time-series data received by the input device 10 is determined. Then, confidence of information is determined using the determined effective period time-series data, and then, the effective period confidence measure of the extracted effective period time-series data is calculated For that reason, the effective period confidence measure can be determined using only the highly trustworthy data in the time-series data. Accordingly, the confidence of the information can be determined with a high accuracy, by taking into consideration of a time-series variation of evaluation.

Third Exemplary Embodiment

Figure 5:
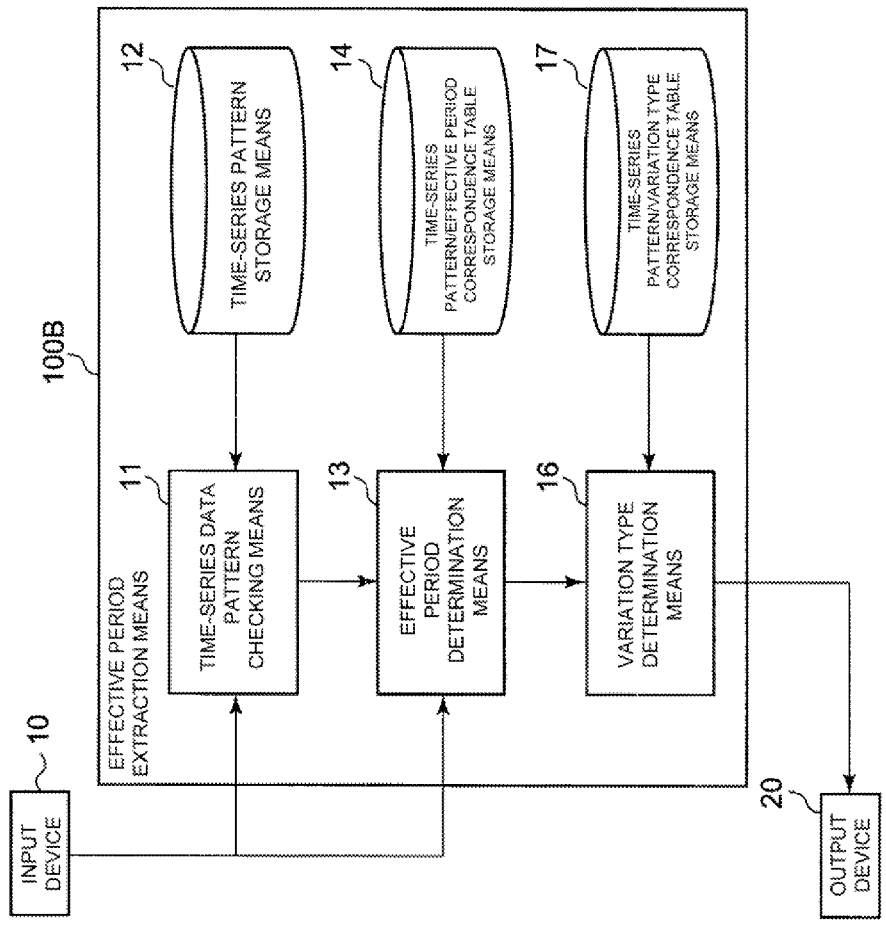
FIG. 5 is a block diagram showing a configuration example of an information analysis system in a third exemplary embodiment.

Next a third exemplary embodiment of the present invention will be described with reference to drawings. FIG. 5 is a block diagram showing a configuration example of an information analysis system in the third exemplary embodiment. This exemplary embodiment is different from the first exemplary embodiment in that the information analysis system includes a variation type determination means 16 and a time-series pattern/variation type correspondence table storage means 17, in addition to the components shown in FIG. 1.

More specifically, the time-series pattern/variation type correspondence table storage means 17 is implemented by a storage device such as a hard disk drive. The time-series pattern/variation type correspondence table storage means 17 stores a time-series pattern/variation type correspondence table including a variation type of time-series data defined for each time-series pattern. The "variation type" may be obtained by classifying a temporal variation tendency in the time-series data for each predetermined typical type. In this exemplary embodiment, the time-series pattern/variation type correspondence table storage means 17 stores the time-series pattern/variation type correspondence table that includes the variation type of the time-series data, corresponding to a time-series pattern ID.

In this exemplary embodiment, the time-series pattern of certain time-series data provides basis for determining the effective period of the time-series data, and also provides basis for estimating the confidence measure (and the effective period confidence measure) with a better accuracy. A time-series pattern that is typified in terms of confidence measure estimation with the better accuracy as described above is referred to as a "variation type".

More specifically, the variation type determination means 16 is implemented by a CPU of a data processing device that operates according to a program. The variation type determination means 16 includes a function of determining a variation type indicating the variation type of time-series data, based on the time-series pattern identified by the time-series data pattern checking means 11. More specifically, the variation type determination means 16 identifies the variation type corresponding to the time-series pattern ID received from the time-series data pattern checking means 11, based on the time-series pattern and variation type corresponding table.

The variation type determination means 16 includes a function of causing the output device 20 to output the determined variation type. The variation type determination means 16 further includes a function of receiving an effective period and effective period time-series data determined by the effective period determination means 13 and causing the output device 20 to output the determined effective period and the determined effective period time-series data.

The variation type determination means 16 may cause the output device 20 to output one of the effective period, effective period time-series data, and variation type of the time-series. Alternatively, the variation type determination means 16 may cause the output device 20 to output a combination of any two of the effective period, effective period time-series data, and variation type of the time-series data. The variation type determination means 16 may cause the output device 20 to output all of the effective period, effective period time-series data, and variation type.

In this exemplary embodiment, effective period extraction means 100B determines the effective period and the effective period time-series data by the effective period determination means 13, and further determines the variation type of the time-series data using the variation type determination means 16. For that reason, the effective period and the effective period time-series data of the time-series data can be recognized, and the variation type can be recognized as supplementary information of the effective period and the effective period time-series data. A temporal variation tendency of the time-series data can also be thereby recognized. Accordingly, in this exemplary embodiment, the variation type determined by the variation type determination means 16 serves as the supplementary information of the effective period and the effective period time-series data.

Functions of the respective components in the information analysis system except the variation type determination means 16 and the time-series pattern/variation type correspondence table storage means 17 are the same as those shown in the first exemplary embodiment.

Figure 6:
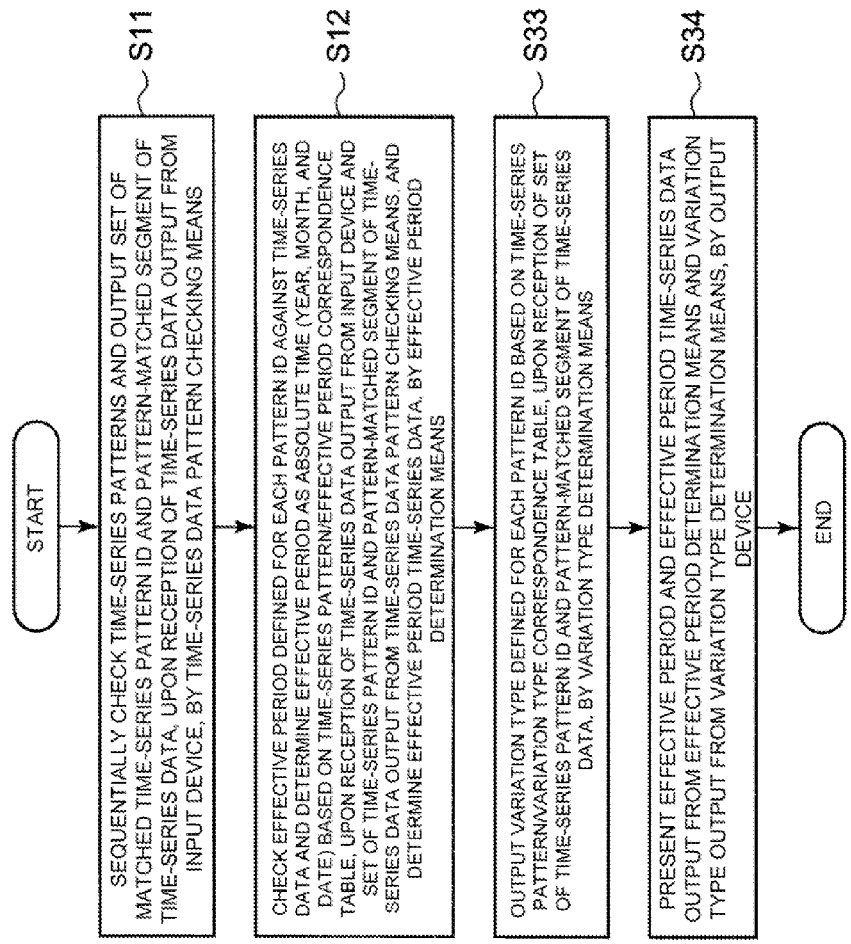
FIG. 6 is a flowchart showing an example of a process in which the information analysis system in the third exemplary embodiment analyzes information transmitted in a time series.

Next, an operation will be described. FIG. 6 is a flowchart showing an example of a process in which the information analysis system in the third exemplary embodiment analyzes information transmitted in a time series. Referring to FIG. 6, processes in steps S11 and S12 are the same as those shown in the first exemplary embodiment.

Next, the variation type determination means 16 of the information analysis system determines the variation type of time-series data, based on a time-series pattern ID and a pattern-matched segment determined by the time-series data pattern checking means 11 and the time-series pattern/variation type correspondence table stored in the time-series pattern/variation type correspondence table storage means 17.

In this case, the variation type determination means 16 receives the set of the time-series pattern ID and the pattern-matched segment of the time-series data, and determines the variation type defined for each time-series pattern ID, based on the time-series pattern/variation type correspondence table (in step S33).

Next, the variation type determination means 16 causes the output device 20 to output the determined variation type and the effective period and the effective period time-series data determined by the effective period determination means 13. Then, the output device 20 outputs (e.g., displays) the effective period, effective period time-series data and variation type, according to an instruction of the variation type determination means 16 (in step S34).

By identifying the effective period and effective period time-series data that have been output, a user can recognize the period in which effective and highly trustworthy data in the time-series data is included and the highly trustworthy data. Further, by identifying the variation type output as the supplementary information, the user can recognize the temporal variation tendency of the time-series data. Further, the user can perform various statistical processes such as data mining using only the highly trustworthy data in the time-series data, based on the effective period and effective period time-series data that have been output. With that arrangement, a highly trustworthy statistical processing result can be obtained.

As described above, according to this exemplary embodiment, the effective period and the effective period time-series data of time-series data received by the input device 10 are determined. Further, the variation type is identified, based on the identified time-series pattern. For that reason, the period including the highly trustworthy data of the time-series data can be grasped while referring to the variation type, and the highly trustworthy data of the time-series data can be thereby obtained. Accordingly, confidence of information can be enhanced, by taking into consideration of the variation type as well as a time-series variation of evaluation. Further, the variation type can be presented to the user together with the effective period and the effective period time-series data, as information for analyzing the confidence of the information.

In the information analysis systems of the related arts as described in Patent Document 1 and Non-Patent Document 1, for example, when confidence of information is determined, a total sum of the numbers of affirmative and negative opinions weighted based on an attribute of an originator alone is obtained, not in consideration of a time-series opinion variation type. The confidence measure of the information is thereby just determined. For that reason, in the information analysis system of the related arts as described in Patent Document 1 and Non-Patent Document 1, when the number of affirmative opinions is the same as the number of negative opinions and the same originator attribute is used, a distinction cannot be made between stable information and information on which the number of the negative opinions rapidly increases and of which the confidence measure greatly varies. In the stable information, a ratio between the numbers of the affirmative and negative opinions is not changed for a certain period, and evaluation on the stable information is fixed. On contrast therewith, in this exemplary embodiment, the variation type is determined using the time-series variation of evaluation. Thus, confidence of information can be enhanced more than with the information analysis systems of the related arts.

Fourth Exemplary Embodiment

Figure 7:
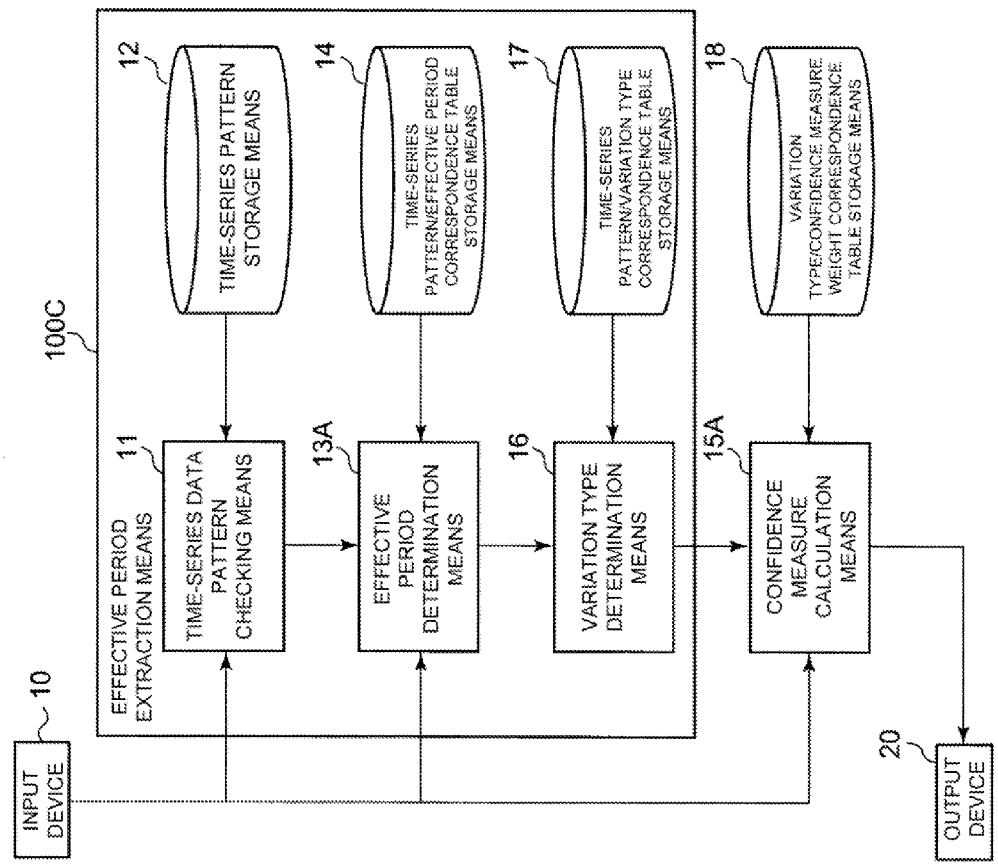
FIG. 7 is a block diagram showing a configuration example of an information analysis system in a fourth exemplary embodiment.

Next, a fourth exemplary embodiment of the present invention will be described with reference to drawings. FIG. 7 is a block diagram showing a configuration example of an information analysis system in the fourth exemplary embodiment. This exemplary embodiment is different from the first exemplary embodiment in that this exemplary embodiment includes a variation type determination means 16, a time-series pattern/variation type correspondence table storage means 17, a confidence measure calculation means 15A, and a variation type/confidence measure weight correspondence table storage means 18, in addition to the components shown in FIG. 1. An effective period determination means 13A in this exemplary embodiment is different from the effective period determination means 13 shown in the first exemplary embodiment in function.

The effective period determination means 13A includes a function of determining effective period time-series data, based on time-series data received from the input device 10 and a time-series pattern identified by the time-series data pattern checking means 11, according to a process similar to that executed by the effective period determination means 13 shown in the first exemplary embodiment. The effective period determination means 13A includes a function of outputting the determined effective period time-series data to the variation type determination means 16.

More specifically, the time-series pattern/variation type correspondence table storage means 17 is implemented by a storage device such as a hard disk drive. The time-series pattern/variation type correspondence table storage means 17 stores a time-series pattern/variation type correspondence table including a variation type of time-series data defined for each time-series pattern. In this exemplary embodiment, the time-series pattern/variation type correspondence table storage means 17 stores the time-series pattern/variation type correspondence table including the variation type of the time-series data, corresponding to a time-series pattern ID.

More specifically, the variation type determination means 16 is implemented by a CPU of a data processing device that operates according to a program. The variation type determination means 16 includes a function of determining the variation type of the time-series data, based on the time-series pattern identified by the time-series data pattern checking means 11. More specifically, the variation type determination means 16 identifies the variation type corresponding to the time-series pattern ID received from the time-series data pattern checking means 11, based on the time-series pattern/variation type correspondence table. The variation type determination means 16 includes a function of outputting the effective period time-series data determined by the effective period determination means 13 A to the confidence measure calculation means 15A, together with the determined variation type.

More specifically, the variation type/confidence measure weight correspondence table storage means 18 is implemented by the storage device such as the hard disk drive. The variation type/confidence measure weight correspondence table storage means 18 stores a variation type/confidence measure weight correspondence table including a confidence measure weighting factor indicating the weight of a confidence measure considered for each variation type. In this exemplary embodiment, the variation type/confidence measure weight correspondence table storage means 18 stores the variation type/confidence measure weight correspondence table including the confidence measure weighting factor, corresponding to the variation type.

The confidence measure calculation means 15A includes a function of determining the confidence measure of an entire portion of the time-series data and the confidence measure of individual transmission information included in the time-series data, based on the time-series data received from the input device 10. The confidence measure calculation means ISA includes a function of determining the confidence measure of the effective period time-series data in consideration of the variation type (hereinafter also referred to as an effective period variation type confidence measure), based on the effective period time-series data and the variation type from the variation type determination means 16.

More specifically, the confidence measure calculation means 15A identifies the confidence measure weighting factor corresponding to the variation type received from the variation type determination means 16, based on the variation type/confidence measure weight correspondence table. Then, the confidence measure calculation means 15A weights the identified confidence measure weighting factor on an effective period confidence measure (calculates a product of the confidence measure weighting factor and the effective period confidence, for example) to determine the effective period variation type confidence measure.

In this exemplary embodiment, the time-series pattern of certain time-series data provides basis for determining the effective period of the time-series data, and also provides basis for estimating the confidence measure (and the effective period confidence measure) with a better accuracy, as in the third exemplary embodiment. A time-series pattern that is typified in terms of confidence measure estimation with the better accuracy as described above is referred to as a "variation type". Further, weight introduced for correcting a confidence measure value with a better accuracy for each variation type is referred to as "confidence measure weight".

In this exemplary embodiment, the product between this confidence measure weight and an original confidence measure value that has been used up to now is referred to as an "effective period variation type confidence measure". The effective period variation type confidence measure is provided to estimate a more accurate confidence measure by considering the variation type of time-series data on a proposition. More specifically, the variation type is derived from the corresponding time-series pattern based on the time-series pattern/variation type correspondence table as shown in FIG. 16, which will be described later. Since a large temporal variation is not seen in the distribution of the affirmation level of time-series data having the time-series pattern ID of 01 over the entire period of a time series, the variation type is classified as an "unvarying type". Further, since no large temporal variation is seen in the distribution of the affirmation level in the variation type classified as the "unvarying type", the confidence measure derived from this time series (confidence measure of confidence) is trustworthy, a confidence measure weight of 1.0 is given. Similarly, in time series data having a time-series pattern ID of 02, an explosive increase in the number of data during a certain period occurs at a current time. The variation type of the time-series data is therefore classified as a "burst type". Further, in this variation type classified as the "burst type", transmission of information on this proposition is in an extremely active state. Thus, confidence of authenticity of the proposition determined from this time-series data cannot be trusted. Thus, a confidence weight of 0.1 is given.

Functions of the respective components in the information analysis system except the effective period determination means 13A, variation type determination means 16, time-series pattern/variation type correspondence table storage means 17, confidence measure calculation means 15A, and variation type/confidence measure weight correspondence table storage means 18 are the same as those shown in the first exemplary embodiment.

Figure 8:
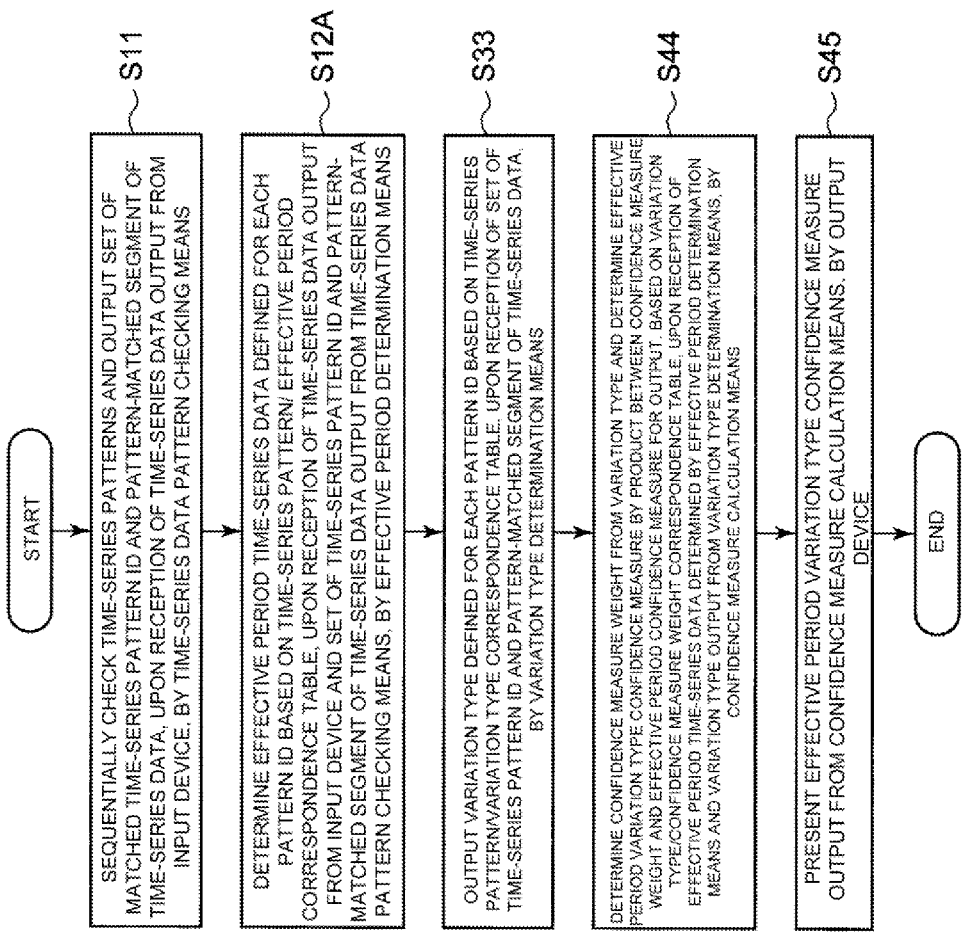
FIG. 8 is a flowchart showing an example of a process in which the information analysis system in the fourth exemplary embodiment analyzes information transmitted in a time series.

Next, an operation will be described. FIG. 8 is a flowchart that shows an example of a process where the information analysis system in the fourth exemplary embodiment analyzes information transmitted in a time series. Referring to FIG. 8, a process in step S11 is the same as that in step S11 shown in the first exemplary embodiment.

Next, the effective period determination means 13A of the information analysis system determines effective period time-series data, based on time-series data received from the input device 10, a time-series pattern ID and a pattern-matched segment from the time-series data pattern checking means 11, and the time-series pattern/effective period correspondence table stored in the time-series pattern/effective period correspondence table storage means 14.

In this case, the effective period determination means 13A receives the time-series data output from the input device 10 and the set of the time-series pattern ID and the pattern-matched segment of the time-series data output from the time-series data pattern checking means 11 and checks an effective period defined for each time-series pattern ID against the time-series data, based on the time-series pattern/effective period correspondence table. Then, the effective period determination means 13A determines the effective period time-series data, based on a result of checking (in step S12A).

Next, the variation type determination means 16 of the information analysis system determines the variation type of the time-series data, based on the time-series pattern ID and the pattern-matched segment determined by the time-series data pattern checking means 11 and the time-series pattern/variation type correspondence table stored in the time-series pattern/variation type correspondence table storage means 17.

In this case, the variation type determination means 16 receives the set of the time-series pattern ID and the pattern-matched segment of the time-series data and determines the variation type defined for each time-series pattern ID, based on the time-series pattern/variation type correspondence table (in step S33).

Next, the confidence measure calculation means 15A determines the confidence measure of an entire portion of the time-series data and the confidence measure of individual transmission information included in the time-series data, based on the time-series data received from the input device 10. The confidence measure calculation means 15A determines an effective period variation type confidence measure, based on the effective period time-series data and the variation type from the variation type determination means 16 and the variation type/confidence measure weight correspondence table stored in the variation type/confidence measure weight correspondence table storage means 18.

In this case, the confidence measure calculation means 15A receives the effective period time-series data determined by the effective period determination means 13A and the variation type output from the variation type determination means 16 and determines a confidence measure weighting factor corresponding to the variation type, based on the variation type/confidence measure weight correspondence table. Then, the confidence measure calculation means 15A calculates a product of the confidence measure weighting factor and an effective period confidence measure, thereby determining the effective period variation type confidence measure (in step S44).

Next, the confidence measure calculation means 15A causes the output device 20 to output the determined effective period variation type confidence measure. Then, the output device 20 outputs (e.g. displays) the effective period variation type confidence measure according to an instruction of the confidence measure calculation means 15A (in step S45). In this case, the confidence measure calculation means 15A may further output the confidence measure of the entire time-series data and the confidence measure of the individual transmission information of the time-series data to the output device 20.

As described above according to this exemplary embodiment, the effective period time-series data and the variation type of time-series data received by the input device 10 are determined. Then, confidence of information is determined, and the effective period variation type confidence measure is determined, using the determined effective period time-series data and the determined variation type. That is, in this exemplary embodiment, the effective period variation type confidence measure is determined based on the extracted effective period time-series data and the identified variation type. For that reason, the effective period variation type confidence measure can be determined using the highly trustworthy data in the time-series data alone, in view of the variation type of the time-series data. Accordingly, the confidence of the information can be determined with a high accuracy, by taking into consideration of a time-series variation of evaluation and the variation type of the time-series data.

In the information analysis systems of the related arts described in Patent Document 1 and Non-Patent Document 1, for example, when confidence of information is determined, a total sum of the numbers of affirmative and negative opinions weighted based on an attribute of an originator alone is obtained, not in consideration of a time-series opinion variation type. The confidence measure of the information is thereby just determined. For that reason, in the information analysis system of the related arts described in Patent Document 1 and Non-Patent Document 1, when the number of affirmative opinions is the same as the number of negative opinions and the same originator attribute is used, a distinction cannot be made between stable information and information on which the number of the negative opinions rapidly increases and of which the confidence measure greatly varies. In the stable information, a ratio between the numbers of the affirmative and negative opinions is not changed for a certain period, and evaluation on the stable information is fixed. On contrast therewith, in this exemplary embodiment, the variation type is determined using the time-series variation of evaluation. Thus, confidence of information can be enhanced more than with the information analysis system of the related arts.

Example

Next, a specific example of the present invention will be described with reference to drawings. In this example, a description will be directed to a case where an information analysis system is implemented by using a personal computer as a data processing device. In this example, the information analysis system includes a display device as an output device 20.

FIG. 9 is an explanatory diagram showing an example of input data (time-series data) read by an input device 10. The input device 10 extracts information indicating an opinion on specific information such as "Green tea is an effective beverage for cancer prevention." from each file stored in a database device. In this example, the input device 10 extracts time-series data including a transmission date, an originator attribute, and information indicating an affirmative or negative opinion level, as shown in FIG. 9.

In the information indicating the measure of an affirmative or negative opinion, the information having a "+" value indicates an affirmative opinion. The information shows that the larger the numeral of the value is, the higher an affirmation measure is. The opinion having a "−" value indicates a negative opinion. The information shows that the larger the numeral of the value is, the higher a negation measure is.

The time-series data pattern checking means 11 first accumulates the number of affirmative opinions and the number of negative opinions from the time-series data as shown in FIG. 9, for a predetermined period, and creates a table that shows an accumulation result of the numbers of the affirmative opinions and the negative opinions. The time-series data pattern checking means 11 creates tables indicating results of accumulating as shown in FIGS. 10 to 13, for example. In the examples in FIGS. 10 to 13, the time-series data pattern checking means 11 accumulates the total number of opinions, the number of affirmative opinions, the number of negative opinions, and a difference between the numbers of the affirmative and negative opinions for each year and creates the tables indicating the accumulation result.

In the examples in FIGS. 10 to 13, the case where the number of the affirmative opinions and the number of the negative opinions are accumulated for each year is shown. The time-series data pattern checking means 11 may accumulate the number of affirmative opinions and the number of negative opinions for each other period such as for each month.

Next, the time-series data pattern checking means 11 receives the time-series data output from the input device 10 and extracts a specific change in the time-series data, based on a time-series variation in an affirmative or negative opinion level distribution in each time interval from T to T+ΔT of the time-series data. In this example, the time-series data pattern checking means 11 extracts the specific change in the time-series data using an indicator of one of a temporal variation of a total number N(T) of the time-series data, a temporal variation of an affirmative/negative opinion level mean E(T), and a temporal variation of a variance $\sigma^2(T)$, (where $\sigma(T)$ is a standard deviation) of an affirmative/negative opinion level distribution during a period from a time t=T to a time t=T+ΔT. Then, the time-series data pattern checking means 11 identifies the time-series pattern of the time-series data, based on a result of the extraction.

The time-series data pattern checking means 11 may identify the time-series pattern based on one of the temporal variation of the total number N(T), temporal variation of the mean E(T), and the temporal variation of the variance $\sigma^2(T)$. Alternatively, the time-series data pattern checking means 11 may identify the time-series pattern based on a combination of two of those indicators. Alternatively, the time-series data pattern checking means 11 may identify the time-series pattern based on all of the temporal variation of the total number N(T), temporal variation of the mean E(T), and the temporal variation of the variance $\sigma^2(T)$.

More specifically, the time-series data pattern checking means 11 identifies whether a varying state of the time-series data is a burst state, a soothed state, an active state, an activated state, a settled state, or a transmission amount maintaining state, for example, based on the temporal variation in the total number N(T) of the time-series data.

The burst state is a state in which the total number of the time-series data is explosively increased during a time interval from t=T to t=T+ΔT and information transmission is concentratedly and actively performed in a short time. The time-series data pattern checking means 11 determines whether or not the time-series data matches a conditional expression shown in Expression (1), for example, thereby deciding whether or not the varying state of the time-series data is the burst state.

$$\{N(T+\Delta T)-N(T)\}/N(T)>\gamma \qquad \text{Expression (1)}$$

where γ is a predetermined positive threshold value.

The soothed state is a state in which the total number of the time-series data falls below a predetermined number, and information transmission is not performed so much during the time interval from t=T to t=T+ΔT. The time-series data pattern checking means 11 determines whether or not the time-series data matches a conditional expression shown in Expression (2), thereby deciding whether or not the varying state of the time-series data is the soothed state.

$$N(T)<\theta N\_\text{low} \qquad \text{Expression (2)}$$

where θN_low is a predetermined positive integer threshold value.

The active state is a state in which the total number of the time-series data exceeds a predetermined number, and information transmission is actively performed during the time interval from t=T to t=T+ΔT. The time-series data pattern checking means 11 determines whether or not the time-series data matches a conditional expression shown in Expression (3), for example, thereby deciding whether or not the varying state of the time-series data is the active state.

$$N(T) > \theta N\_high \qquad \text{Expression (3)}$$

where θN_high is a predetermined positive integer threshold value.

The activated state is a state in which an increase amount of the total number of the time-series data exceeds a predetermined standard, and information transmission is being more activated during the time interval from t=T to t=T+ΔT. The time-series data pattern checking means 11 determines whether or not the time-series data matches a conditional expression shown in Expression (4), for example, thereby determining whether or not the varying state of the time-series data is the activated state.

$$\{N(T+\Delta T) - N(T)\}/\Delta T > \theta \Delta N/\Delta T \qquad \text{Expression (4)}$$

where θΔN/ΔT is a predetermined positive integer threshold value.

The settled state is a state in which a reduction amount of the total number of time-series data exceeds the predetermined standard and information transmission is being settled more during the time interval from t=T to t=T+ΔT. The time-series data pattern checking means 11 determines whether or not the time-series data matches a conditional expression shown in Expression (5), for example, thereby deciding whether or not varying state of the time-series data is the settled state.

$$\{N(T+\Delta T) - N(T)\}/\Delta T < -\theta \Delta N/\Delta T \qquad \text{Expression (5)}$$

The transmission amount maintaining state is a state in which an increase/decrease amount of the total number of time-series data falls below the predetermined standard, and an information transmission amount is maintained during the time interval from t=T to t=T+ΔT. The time-series data pattern checking means 11 determines whether or not the time-series data matches a conditional expression shown in Expression (6), for example, thereby deciding whether or not the varying state of the time-series data is the transmission amount maintaining state.

$$-\theta N/\Delta T < \{N(T+\Delta T) - N(T)\}/\Delta T < \theta \Delta N/\Delta T \qquad \text{Expression (6)}$$

Alternatively, the time-series data pattern checking means 11 identifies the varying state of the time-series data as one of an affirmation dominant state, a negation dominant state, an affirmation-negation balanced state, an affirming state, a negating state, an inverted state, or an affirmation-negation equilibrium state, based on the temporal variation of the affirmation opinion/negation opinion level mean E(T).

The affirmation dominant state is a state in which an affirmative opinion/negative opinion level mean value of the time-series data exceeds a predetermined standard to assume a value on an affirmation side, and affirmative opinions are more dominant than negative opinions during the time interval from t=T to t=T+ΔT. The time-series data pattern checking means 11 determines whether or not the time-series data matches a conditional expression shown in Expression (7), for example, thereby deciding whether or not the varying state of the time-series data is the affirmation dominant state.

$$E(T) > \theta E \qquad \text{Expression (7)}$$

where θE is a predetermined positive threshold value.

The negation dominant state is a state in which the affirmative opinion/negative opinion level mean value of the time-series data falls below a predetermined standard to assume a value on a negation side, and negative opinions are more dominant than affirmative opinions during the time interval from t=T to t=T+ΔT. The time-series data pattern checking means 11 determines whether or not the time-series data matches a conditional expression shown in Expression (8), for example, thereby determining whether or not the varying state of the time-series data is the negation dominant state.

$$E(T) < -\theta E \qquad \text{Expression (8)}$$

The affirmation-negation balanced state is a state in which the affirmative opinion/negative opinion level mean value of the time-series data assumes an intermediate value within a range between the predetermined standards, and both of negative opinions and affirmative opinions are balanced during the time interval from t=T to t=T+ΔT. The time-series data pattern checking means 11 determines whether or not the time-series data matches a conditional expression shown in Expression (9), for example, thereby deciding whether or not the varying state of the time-series data is the affirmation/negation balanced state.

$$-E < E(T) < \theta E \qquad \text{Expression (9)}$$

The affirming state is a state in which an increase amount of the affirmative opinion/negative opinion level mean value of the time-series data exceeds a predetermined standard, and affirmative opinions are being more dominant during the time interval from t=T to t=T+ΔT. The time-series data pattern checking means 11 determines whether or not the time-series data matches a conditional expression shown in Expression (10), for example, thereby deciding whether or not the varying state of the time-series data is the affirming state.

$$|E(T+\Delta T) - E(T)|/\Delta T > \theta \Delta/\Delta T \qquad \text{Expression (10)}$$

where θΔE/ΔT is a predetermined positive threshold value.

The negating state is a state in which a decrease amount of the affirmative opinion/negative opinion level mean value of the time-series data exceeds the predetermined standard, and negative opinions are being more dominant during the time interval from t=T to t=T+ΔT. The time-series data pattern checking means 11 determines whether or not the time-series data matches a conditional expression shown in Expression (11), for example, thereby deciding whether or not the varying state of the time-series data is the negating state.

$$|E(T+\Delta T) - E(T)|/\Delta T < -\theta \Delta E/\Delta T \qquad \text{Expression (11)}$$

The inverted state is a state in which the affirmative opinion/negative opinion level mean value of the time-series data is changed from a value on the negative side to a value on the affirmative side, and an inversion phenomenon from a state in which the negative opinions are dominant to a state in which the affirmative opinions are dominant occurs, or the mean value is changed from a value on the affirmative side to a value on the negative side and an inversion phenomenon from the state in which the affirmative opinions are dominant to the state in which the negative opinions are dominant occurs, during the time interval from t=T to t=T+ΔT. The time-series data pattern checking means 11 determines whether or not the time-series data matches a conditional expression shown in Expression (12), for example, thereby deciding whether or not the varying state of the time-series data is the inverted state.

$$E(T) > \theta E \text{ and } E(T+\Delta T) < -\theta E$$

or $$E(T) < -\theta E \text{ and } E(T+\Delta T) > \theta E \qquad \text{Expression (12)}$$

The inversion phenomenon from the state in which the negative opinions are dominant to the state in which the affirmative opinions are dominant may be defined to be different from the inversion phenomenon from the state in which the affirmative opinions are dominant to the state in which the negative opinions are dominant, and may be used for identifying the time-series pattern.

The affirmation-negation equilibrium state is a state in which an increase or decrease amount of the affirmative opinion/negative opinion level mean value of the time-series data falls below the predetermined standard, and one of the affirmation dominant state, negation dominant state, and affirmation-negation balanced state is maintained during the time interval from t=T to t=T+ΔT. The time-series data pattern checking means 11 determines whether or not the time-series data matches a conditional expression shown in Expression (13), for example, thereby deciding whether or not the varying state of the time-series data is the affirmation-negation equilibrium state.

$$-\theta \Delta E/\Delta T < |E(T+\Delta T)-E(T)|/\Delta T < \theta \Delta E/\Delta T \qquad \text{Expression (13)}$$

The time-series data pattern checking means 11 identifies the varying state of the time-series data as one of a divergence state, a convergence state, a diverging state, a converging state, and a distribution stable state, for example, based on the temporal variation of the variance $\sigma^2(T)$ of the affirmative/negative opinion level distribution.

The divergence state is a state in which an affirmative/negative opinion level distribution value of the time-series data exceeds a predetermined amount, and a large variation is seen in an affirmative/negative opinion level value of each data during the time interval from t=T to t=T+ΔT. The time-series data pattern checking means 11 determines whether or not the time-series data matches a conditional expression shown in Expression (14), thereby deciding whether or not the varying state of the time-series data is the divergence state.

$$\sigma(T) > \theta\sigma\_\text{high} \qquad \text{Expression (14)}$$

where $\theta\sigma\_\text{high}$ is a predetermined positive threshold value.

The convergence state is a state in which the affirmative/negative opinion level distribution value of the time-series data falls below a predetermined amount, and a large variation is not seen in the affirmative/negative opinion level value of each data during the time interval from t=T to t=T+ΔT. The time-series data pattern checking means 11 determines whether or not the time-series data matches a conditional expression shown in Expression (15), thereby deciding whether or not the varying state of the time-series data is the convergence state.

$$\sigma(T) < \theta\sigma\_\text{low} \qquad \text{Expression (15)}$$

where $\theta\sigma\_\text{low}$ is a predetermined positive threshold value.

The diverging state is a state in which the affirmative/negative opinion level distribution value of the time-series data exceeds a predetermined standard, and a variation in the affirmative/negative opinion level value of each data is increasing more during the time interval from t=T to t=T+ΔT. The time-series data pattern checking means 11 determines whether or not the time-series data matches a conditional expression shown in Expression (16), for example, thereby deciding whether or not the varying state of the time-series data is the diverging state.

$$|\sigma(T+\Delta T)-\sigma(T)|/\Delta T > \theta \Delta \sigma/\Delta T \qquad \text{Expression (16)}$$

where $\theta \Delta \sigma/\Delta T$ is a predetermined positive threshold value.

The converging state is a state in which a decrease amount of the affirmative/negative opinion level distribution value of the time-series data exceeds the predetermined standard, and a variation in the affirmative/negative opinion level value of each data is decreasing more during the time interval from t=T to t=T+ΔT. The time-series data pattern checking means 11 determines whether or not the time-series data matches a conditional expression shown in Expression (17), for example, thereby deciding whether or not the varying state of the time-series data is the converging state.

$$|\sigma(T+\Delta T)-\sigma(T)|/\Delta T < -\theta \Delta \sigma/\Delta T \qquad \text{Expression (17)}$$

The distribution stable state is a state in which an increase or decrease amount of the affirmative/negative opinion level distribution value of the time-series data falls below the predetermined standard, and the diverging state or the converging state is maintained during the time interval from t=T to t=T ΔT. The time-series data pattern checking means 11 determines whether or not the time-series data matches a conditional expression shown in Expression (18), for example, thereby deciding whether or not the varying state of the time-series data is the distribution stable state.

$$-\theta \Delta \sigma/\Delta T < |\sigma(T+\Delta T)-\sigma(T)|/\Delta T < \theta \Delta \sigma < \Delta T \qquad \text{Expression (18)}$$

A description will be directed to a case where the time-series pattern is identified using burst state determination and the inverted state determination among the respective state determinations described above. In the burst state determination, it is determined whether or not the time-series pattern is in the burst state. In the inverted state determination, it is determined whether or not the time-series pattern is in the inverted state. FIG. 14 is an explanatory diagram showing a specific example of a time-series pattern correspondence table stored in the time-series pattern storage means 12, which uses the burst state determination and the inverted state determination.

When the time-series pattern correspondence table shown in FIG. 14 is used, the time-series data pattern checking means 11 uses the conditional expression in Expression (1), thereby deciding whether or not a period of the burst state (burst period) is present and how many burst periods are present (which is a first condition), and whether or not a current state is also in the burst period (which is a second condition). The time-series data pattern checking means 11 uses the conditional expression in Expression (12), thereby deciding whether or not the inverted state is present in the time-series data (which is a third condition).

Referring to the example shown in FIG. 10, the time-series data pattern checking means 11 determines that there is one burst period in the year of 2003, and that the current state is not in the burst period and is the inverted state in which the number of affirmative opinions and the number of negative opinions are inverted before and after the burst period. For that reason, referring to the example shown in FIG. 10, the time-series data pattern checking means 11 extracts the time-series pattern ID of "03" from the time-series pattern correspondence table shown in FIG. 14.

Referring to the example shown in FIG. 11, the time-series data pattern checking means 11 determines that there is no burst period. For that reason, referring to the example shown in FIG. 11, the time-series data pattern checking means 11 extracts the time-series pattern ID of "01" from the time-series pattern correspondence table shown in FIG. 14.

Referring to the example in FIG. 12, the time-series data pattern checking means 11 determines that there is one burst period in a period from the year of 2006 to the year of 2007, and that the current state is also in the burst period. For that reason, referring to the example shown in FIG. 12, the time-series data pattern checking means 11 extracts the time-series pattern ID of "02" from the time-series pattern correspondence table shown in FIG. 14.

Referring to the example in FIG. 13, the time-series data pattern checking means 11 determines that there are a total of three burst periods in the years of 1999, 2002, and 2006, and that the current state is not in the burst period and there is no inverted state. For that reason, referring to the example in FIG. 13, the time-series data pattern checking means 11 extracts the time-series pattern ID of "07" from the time-series pattern correspondence table shown in FIG. 14.

FIG. 15 is an explanatory diagram showing a specific example of a time-series pattern/effective period correspondence table stored in time-series pattern/effective period correspondence table storage means 14. Effective period determination means 13 (which may be effective period determination means 13A) determines the effective period of time-series data, using the time-series pattern/effective period correspondence table shown in FIG. 15.

Referring to the example shown in FIG. 10, for example, the effective period determination means 13 extracts the effective period of a "period after inversion" corresponding to the time-series ID of "03" from the time-series pattern/effective period, correspondence table shown in FIG. 15. The effective period determination means 13 extracts data after the year of 2003 shown in FIG. 10 as effective period time-series data, according to the effective period of the "period after inversion".

Referring to the example shown in FIG. 11, the effective period determination means 13 extracts the effective period of a "whole period" corresponding to the time-series ID of "01" from the time-series pattern/effective period correspondence table shown in FIG. 15. The effective period determination means 13 determines whole data shown in FIG. 11 as the effective period time-series data according to the effective period of the "whole period".

Referring to the example shown in FIG. 12, the effective period determination means 13 extracts the effective period of "no" effective period corresponding to the time-series ID of "02" from the time-series pattern/effective period correspondence table shown in FIG. 15. Since there is no effective period in the time-series data in this case, there is no effective period time-series data. Further, even if there is "no" effective period, a user can recognize a variation tendency of the time-series data such as that of the "burst type" when the variation type of the time-series data is determined as supplementary information on the effective period.

Referring to the example shown in FIG. 13, for example, the effective period determination means 13 extracts the effective period of the "whole period" corresponding to the time-series ID of "07" from the time-series pattern/effective period correspondence table shown in FIG. 15. The effective period determination means 13 determines whole data shown in FIG. 13 as effective period time-series data according to the effective period of the "whole period".

In the third and fourth exemplary embodiments, the information analysis system includes the variation type determination means 16 and the time-series pattern/variation type correspondence table storage means 17. FIG. 16 is an explanatory diagram showing a specific example of the time-series pattern/variation type correspondence table stored in the time-series pattern/variation type correspondence table storage means 17. The variation type determination means 16 determines the variation type of time-series data, using the time-series pattern/variation type correspondence table shown in FIG. 16.

Referring to the example shown in FIG. 10, for example, the variation type determination means 16 extracts the variation type of "inversion type" corresponding to the time-series ID of "03" from the time-series pattern/variation type correspondence table shown in FIG. 16. Further, referring to the example shown in FIG. 11, for example, the variation type determination means 16 extracts the variation type of "unvarying type" corresponding to the time-series ID of "01" from the time-series pattern/variation type correspondence table shown in FIG. 16. Referring to the example shown in FIG. 12, for example, the variation type determination means 16 extracts the variation type of "burst type" corresponding to the time-series ID of "02" from the time-series pattern/variation type correspondence table shown in FIG. 16. Referring to the example shown in FIG. 13, for example, the variation type determination means 16 extracts the variation type of "periodic event type" corresponding to the change series ID of "07" from the time-series pattern/variation type correspondence table shown in FIG. 16.

In the case of the first exemplary embodiment, the determined effective period of "period after inversion", "whole period", or "no effective period" and effective period time-series data are displayed on the display device. In the case of the third exemplary embodiment, the variation type of "inversion type", "unvarying type", "burst type", "periodic event type", or the like is displayed on the display device.

In the case of the second exemplary embodiment, the confidence measure calculation means 15 determines an effective period confidence measure based on effective period time-series data. In this case, the confidence measure calculation means 15 calculates a confidence measure $F(\{Xi\})$ of time-series data $\{Xi|i=1, 2, \ldots, N\}$, for example, using a familiarity level of an information originator and an affirmative opinion/negative opinion level (refer to Non-Patent Document 1).

Further, in the case of the fourth exemplary embodiment, the confidence measure calculation means 15A obtains an effective period variation type confidence measure based on effective period time-series data, using the variation type/confidence measure weight correspondence table stored in the variation type/confidence measure weight correspondence table storage means 18. FIG. 17 is an explanatory diagram showing a specific example of the variation type/confidence measure weight correspondence table stored in the variation type/confidence measure weight correspondence table storage means 18. When obtaining the effective period variation type confidence measure, the confidence measure calculation means 15A determines a confidence measure weighting factor w using the variation type/confidence measure weight correspondence table shown in FIG. 17. Then, the confidence measure calculation means ISA calculates a product $(w \times F(\{Xi\}))$ between an effective period confidence measure and the confidence measure weighting factor to obtain the effective period variation type confidence measure.

Referring to the example shown in FIG. 10, for example, the confidence measure calculation means ISA extracts the confidence measure weighting factor of "0.5" corresponding to the variation type of "inversion type" from the time-series pattern/variation type correspondence table shown in FIG. 17. When it is assumed that the effective period confidence measure $F(\{Xi\})$ determined not in consideration of the variation type is 70, the confidence measure calculation means 15A calculates a product of the extracted confidence measure weighting factor of "0.5" and the effective period confidence measure of "70" to obtain the effective period variation type confidence measure of "35".

Similarly, in the example shown in FIG. 11, for example the confidence measure calculation means 15A extracts the confidence measure weighting factor of "1.0" corresponding to the variation type of "unvarying type" from the time-series pattern/variation type correspondence table shown in FIG. 17. The confidence measure calculation means 15A then calculates a product of the extracted confidence measure weighting factor of "1.0" and an effective period confidence measure, thereby obtaining an effective period variation type confidence measure.

Similarly, in the example shown in FIG. 13, for example the confidence measure calculation means 15A extracts the confidence measure weighting factor of "0.8" corresponding to the variation type of "periodic event type" from the time-series pattern/variation type correspondence table shown in FIG. 17. The confidence measure calculation means 15A then calculates a product of the extracted confidence measure weighting factor of "0.8" and an effective period confidence measure to obtain an effective period variation type confidence measure.

The example shown in FIG. 12 shows a case where there is "no" effective period. Thus, the effective period time-series data is not extracted. For that reason, the confidence measure calculation means 15A cannot calculate an effective period variation type confidence measure, and determines that the confidence measure cannot be decided.

This example shows the case where the burst state determination and the inverted state determination are made to identify the time-series pattern, using the time-series pattern correspondence table shown in FIG. 14. The manner of identifying the time-series pattern is not limited to the one shown in this example. In addition to the burst state determination and the inverted state determination among the respective state determinations shown in this example, divergence state determination that determines whether or not the time-series pattern is in the divergence state, transmission amount maintaining state determination that determines whether or not the time-series pattern is in the transmission amount maintaining state, affirmation-negation equilibrium state determination that determines whether or not the time-series pattern is in the affirmation-negation equilibrium state, affirmation dominant state determination that determines whether or not the time-series pattern is in the affirmation dominant state, affirming state determination that determines whether or not the time-series pattern is in the affirming state, negation dominant state determination that determines whether or not the time-series pattern is in the negation dominant state, and negating state determination that determines whether or not the time-series pattern is in the negating state may be used to identify the time-series pattern.

FIG. 18 is an explanatory diagram showing a specific example of the time-series pattern correspondence table that uses the divergence state determination, transmission amount maintaining state determination, affirmation-negation equilibrium state, affirmation dominant state determination, affirming state determination, negation dominant state determination, and negating state determination, in addition to the burst state determination and the inverted state determination. FIG. 18 further shows a variation type (refer to a bracketed description in each column of a time-series pattern ID) corresponding to a time-series pattern in each column of the time-series pattern ID.

When the time-series pattern correspondence table shown in FIG. 18 is used, the time-series data pattern checking means 11 determines whether or not the burst state period (burst period) is present and how many burst periods are present in time-series data (which is a first condition) and whether or not a current state is also in the burst period (which is a second condition). The time-series data pattern checking means 11 determines whether or not the divergence state is present in the time-series data (which is the second condition), using the conditional expression in Expression (14).

When the time-series pattern correspondence table shown in FIG. 18 is used, the time-series data pattern checking means 11 determines whether or not the inverted state is present in the time-series data (which is a third condition), using the conditional expression in Expression (12). The time-series data pattern checking means 11 further determines whether or not a whole part or a part of the time-series data is in the transmission amount maintaining state (which is the third condition), using the conditional expression in Expression (6).

When the time-series pattern correspondence table shown in FIG. 18 is used, the time-series data pattern checking means 11 determines whether or not the time-series data is in the affirmation-negation equilibrium state (which is a fourth condition), using the conditional expression in Expression (13). The time-series data pattern checking means 11 further determines whether or not the time-series data is in the affirmation dominant state (which is the fourth condition), using the conditional expression in Expression (7). The time-series data pattern checking means 11 determines whether or not the time-series pattern is in the affirming state (which is the fourth condition), using the conditional expression in Expression (10). The time-series data pattern checking means 11 further determines whether or not the time-series pattern is in the negation dominant state (which is the fourth condition) using the conditional expression in Expression (8). The time-series data pattern checking means 11 determines whether or not the time-series data is in the negating state (which is the fourth condition), using the conditional expression in Expression (11).

The information analysis system presents (displays) the confidence measure, effective period, effective period time-series data, and variation type determined in the respective processes described above. In this case, the information analysis system may display the variation type in the form of a classification name such as the "unvarying type" or the "inversion type". Alternatively, the numbers of affirmative opinions and negative opinions may be displayed on a graph in a time series, based on results of accumulating of the time-series data shown in FIGS. 10 to 13.

INDUSTRIAL APPLICABILITY

The present invention can be applied to a use of an information analysis system or an information analysis device that evaluates confidence of information gathered through the Internet. The present invention can be further applied to a use of a program for implementing the information analysis system using a computer.

Modifications and adjustments of the exemplary embodiments and the example are possible within the scope of the overall disclosure (including claims) of the present invention, and based on the basic technical concept of the invention. Various combinations and selections of various disclosed elements are possible within the scope of the claims of the present invention.

What is claimed is:

1. An information analysis apparatus comprising:
   a time-series pattern identification unit that identifies a time-series pattern on time-series data from the time-series data including sets of at least an affirmation level on a certain proposition and a time stamp corresponding to the affirmation level, based on at least one of indicators of a temporal variation in a total number of data of the time-series data for each time interval, a temporal variation of a mean of an affirmation level for each time interval, and a temporal variation of a variance of an affirmation level for each time interval; and an effective period identification unit that identifies an effective period of the time-series data on the proposition, based on the identified time-series pattern, wherein the proposition is a statement that expresses an opinion, the affirmation level is a level of opinions stating that the certain proposition is true, and each of the time-series pattern identification unit and the effective period identification unit is a hardware device.

2. The information analysis apparatus according to claim 1, wherein the time-series pattern identification unit further checks whether or not the time series data has assumed a burst state in which the total number of the data of the time-series data for each time interval increases in a short time to identify the time-series pattern on the time-series data.

3. The information analysis apparatus according to claim 1, wherein the time-series pattern identification unit further checks whether or not the time-series data has assumed an inverted state in which a mean value of the affirmation levels of the time-series data for each time interval changes from a value on a negation side to a value on an affirmation side or from the value on the affirmation side to the value on the negation side to identify the time-series pattern on the time-series data.

4. The information analysis apparatus according to claim 1, wherein the time-series pattern identification unit further checks whether or not the time-series data has assumed a divergence state in which a variance value of the affirmation level of the time-series data for each time interval exceeds a first threshold value defined in advance or the time-series data has assumed a convergence state in which the variance value falls below a second threshold value defined in advance to identify the time-series pattern on the time-series data.

5. The information analysis apparatus according to claim 1, further comprising an effective period confidence measure calculation unit that extracts the time-series data included in the effective period identified by the effective period identification unit, and then calculates a confidence measure of the time-series data included in the extracted effective period, wherein the effective period confidence measure calculation unit is a hardware device.

6. An information analysis method comprising:

identifying, by a computer, a time-series pattern on time-series data from the time-series data including sets of at least an affirmation level on a certain proposition and a time stamp corresponding to the affirmation level, based on at least one of indicators of a temporal variation in a total number of data of the time-series data for each time interval, a temporal variation of a mean of an affirmation level for each time interval, and a temporal variation of a variance of an affirmation level for each time interval; and identifying an effective period of the time-series data on the proposition, based on the identified time-series pattern, wherein the proposition is a statement that expresses an opinion, and the affirmation level is a level of opinions stating that the certain proposition is true.

7. The information analysis method according to claim 6, comprising further checking whether or not the time-series data has assumed a burst state in which the total number of the data of the time-series data for each time interval increases in a short time to identify the time-series pattern on the time-series data.

8. The information analysis method according to claim 6, comprising further checking whether or not the time-series data has assumed an inverted state in which a mean value of the affirmation levels of the time-series data for each time interval changes from a value on a negation side to a value on an affirmation side or from the value on the affirmation side to the value on the negation side to identify the time-series pattern on the time-series data.

9. The information analysis method according to claim 6, comprising further checking whether or not the time-series data has assumed a divergence state in which a variance value of the affirmation level of the time-series data for each time interval exceeds a first threshold value defined in advance or the time-series data has assumed a convergence state in which the variance value falls below a second threshold value defined in advance to identify the time-series pattern on the time-series data.

10. The information analysis method according to claim 6, comprising:

extracting the time-series data included in the effective period, and then calculating a confidence measure of the time-series data included in the extracted effective period.

11. A non-transitory computer-readable recording medium storing an information analysis program that causes a computer to execute:

a time-series pattern identification process that identifies a time-series pattern on time-series data from the time-series data comprising sets of at least an affirmation level on a certain proposition and a time stamp corresponding to the affirmation level, based on at least one of indicators of a temporal variation in a total number of data of the time-series data for each time interval, a temporal variation of a mean of an affirmation level for each time interval and a temporal variation of a variance of an affirmation level for each time interval; and an effective period identification process that identifies an effective period of the time-series data on the proposition, based on the identified time-series pattern, wherein the proposition is a statement that expresses an opinion, and the affirmation level is a level of opinions stating that the certain proposition is true.

12. The non-transitory computer-readable recording medium storing the information analysis program according to claim 11, which causes the computer to execute a process that further checks whether or not the time-series data has assumed a burst state in which the total number of the time-series data for each time interval increases in a short time to identify the time-series pattern on the time-series data, in the time-series pattern identification process.

13. The non-transitory computer-readable recording medium storing the information analysis program according to claim 11, which causes the computer to execute a process that further checks whether or not the time-series data has assumed an inverted state in which a mean value of the affirmation levels of the time-series data for each time interval changes from a value on a negation side to a value on an affirmation side or from the value on the affirmation side to the value on the negation side to identify the time-series pattern on the time-series data, in the time-series pattern identification process.

14. The non-transitory computer-readable recording medium storing the information analysis program according to claim 11, which causes the computer to execute a process that further checks whether or not the time-series data has assumed a divergence state in which a variance value of the affirmation level of the time-series data for each time interval exceeds a first threshold value defined in advance or the time-series data has assumed a convergence state in which the variance value falls below a second threshold value defined in advance to identify the time-series pattern on the time-series data, in the time-series pattern identification process.

15. The non-transitory computer-readable recording medium storing the information analysis program according to claim 11, which causes the computer to execute an effective period confidence measure calculation process that extracts the time-series data included in the effective period identified in the effective period identification process, and then calculates a confidence measure of the time-series data included in the extracted effective period.

* * * * *